July 4, 1950 O. A. PEARCE ET AL 2,513,964

TELEPHONE SYSTEM

Filed July 27, 1945 19 Sheets-Sheet 1

INVENTORS
OWEN AVIS PEARCE
GEORGE THOMAS BAKER

BY Chas. W. Canty

ATTORNEY

INVENTORS.
OWEN AVIS PEARCE
GEORGE THOMAS BAKER
BY [signature]
ATTORNEY

INVENTORS.
OWEN AVIS PEARCE
GEORGE THOMAS BAKER

BY [signature]
ATTORNEY.

INVENTORS.
OWEN AVIS PEARCE
GEORGE THOMAS BAKER

BY Chas. W. Candy
ATTORNEY

July 4, 1950 O. A. PEARCE ET AL 2,513,964

TELEPHONE SYSTEM

Filed July 27, 1945 19 Sheets-Sheet 5

INVENTORS.
OWEN AVIS PEARCE
GEORGE THOMAS BAKER

BY Chas. Lee Candy
ATTORNEY

July 4, 1950 O. A. PEARCE ET AL 2,513,964

TELEPHONE SYSTEM

Filed July 27, 1945 19 Sheets-Sheet 6

INVENTORS.
OWEN AVIS PEARCE
GEORGE THOMAS BAKER

BY Chas. Lu. Candy

ATTORNEY

July 4, 1950 O. A. PEARCE ET AL 2,513,964

TELEPHONE SYSTEM

Filed July 27, 1945 19 Sheets-Sheet 7

INVENTORS
OWEN AVIS PEARCE
GEORGE THOMAS BAKER

BY Chas. W. Candy
ATTORNEY

INVENTORS.
OWEN AVIS PEARCE
GEORGE THOMAS BAKER
BY Chas. W. Candy
ATTORNEY

INVENTORS
OWEN AVIS PEARCE
GEORGE THOMAS BAKER
BY [signature]
ATTORNEY

INVENTORS.
OWEN AVIS PEARCE
GEORGE THOMAS BAKER
BY Chas. W. Candy
ATTORNEY

INVENTORS.
OWEN AVIS PEARCE
GEORGE THOMAS BAKER
BY Chas. W. Candy
ATTORNEY

INVENTORS.
OWEN AVIS PEARCE
GEORGE THOMAS BAKER
BY Chas. W. Candy
ATTORNEY

INVENTORS.
OWEN AVIS PEARCE
GEORGE THOMAS BAKER
BY Chas. Ln. Candy
ATTORNEY

INVENTORS.
OWEN AVIS PEARCE
GEORGE THOMAS BAKER
BY Chas. W. Candy
ATTORNEY

INVENTORS
OWEN AVIS PEARCE
GEORGE THOMAS BAKER
BY Chas. W. Candy
ATTORNEY

INVENTORS.
OWEN AVIS PEARCE
GEORGE THOMAS BAKER
BY Chas. L. Candy
ATTORNEY

TELEPHONE SYSTEM

Filed July 27, 1945 19 Sheets-Sheet 17

INVENTORS.
OWEN AVIS PEARCE
GEORGE THOMAS BAKER
BY Chas. W. Cardy
ATTORNEY

INVENTORS.
OWEN AVIS PEARCE
GEORGE THOMAS BAKER
BY
ATTORNEY

July 4, 1950 O. A. PEARCE ET AL 2,513,964

TELEPHONE SYSTEM

Filed July 27, 1945 19 Sheets-Sheet 19

INVENTORS.
OWEN AVIS PEARCE
GEORGE THOMAS BAKER

BY Chas. W. Cardy

ATTORNEY

Patented July 4, 1950 2,513,964

UNITED STATES PATENT OFFICE 2,513,964

TELEPHONE SYSTEM

Owen Avis Pearce and George Thomas Baker, Liverpool, England, assignors to Automatic Electric Laboratories Inc., Chicago, Ill., a corporation of Delaware Application July 27, 1945, Serial No. 607,472
In Great Britain August 25, 1944

15 Claims. (Cl. 179—27)

Figure 1:
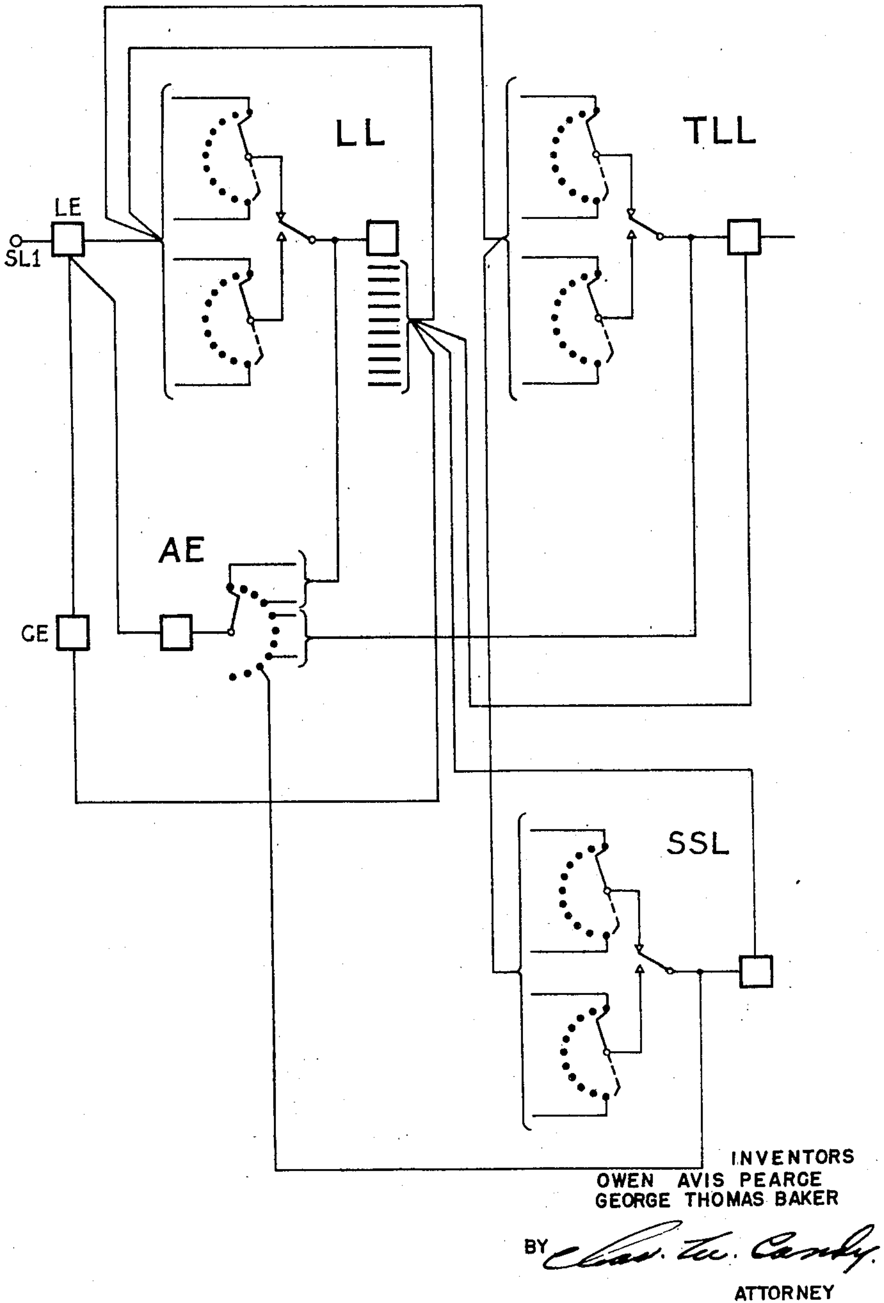

The present invention relates to telephone systems and has for its general object to provide a readily expandable small automatic telephone exchange board of the private or rural type.

A further object of the invention is concerned with an improved method for associating calling lines with the numerous special facilities which are often required on such boards and it is also concerned with improved methods of initiation and control of such facilities.

On private automatic exchange boards in particular the general practice is to provide basic selecting equipment for the setting up of conversational connections between subscribers, the design of such equipment differing according to the line capacity and traffic considerations of the board concerned. Furthermore, where any special facilities are required such as service to other interconnected private automatic exchanges (tie lines), code call and fire alarm services and the like the general procedure has been to incorporate as much as possible of the circuits for these features in the basic circuits of the board. Since both the line capacity and the special services vary from board to board the number of circuit combinations involved is large and this militates against mass production of such boards.

According to the present invention a small automatic exchange board is arranged to be built up from one or more identical units each comprising a number of local finder/connector links, tie line service links and other special service links being provided in individual units which can be added to the board at will.

According to a feature of the invention in response to the dialling of a suitable number a special service link is adapted to associate itself with a calling line by a finding operation, whereupon the local link previously taken into use is released for further use.

According to another feature of the invention a priority subscriber on setting up a call to an engaged line is enabled to cut in on to said line by dialling an additional digit of predetermined value.

According to a further feature of the invention, after a watchman's service link has associated itself with a calling line in response to the dialling of a suitable code number the dialling of an additional digit of predetermined value serves to enable telephone communication to be effected between the calling party and a central station.

According to a further feature of the invention the finder switches of both local and special service links are served by a common set of allotting switches the banks of which are subdivided in such manner as to give access to the various types of finders required according to the circumstances of the call concerned. The common allotting switches also serve to allocate an order of priority to the various different finding operations in cases where two or more different finding operations are being initiated simultaneously.

According to a further feature of the invention, after the dialling of the selecting digits necessary to associate a calling line with a called line the dialling of a further digit of predetermined value is, if the line is either disengaged or if the call has not been accepted, adapted to result in the association of a code call link with the called line.

According to still another feature of the invention a local link is adapted to respond to an additional dialled digit after a line selecting operation has been performed the normal or operated condition of the called subscriber's battery feeding relay in the link circuit serving to determine whether or not a special service link shall be brought into operation.

The invention will be better understood from the following description of one method of carrying it into effect, reference being had to the accompanying drawings comprising Figs. 1–19 in which it is shown applied to a 100-line P. A. X board.

Fig. 1 shows the essential trunking arrangements of the board.

Figure 2:
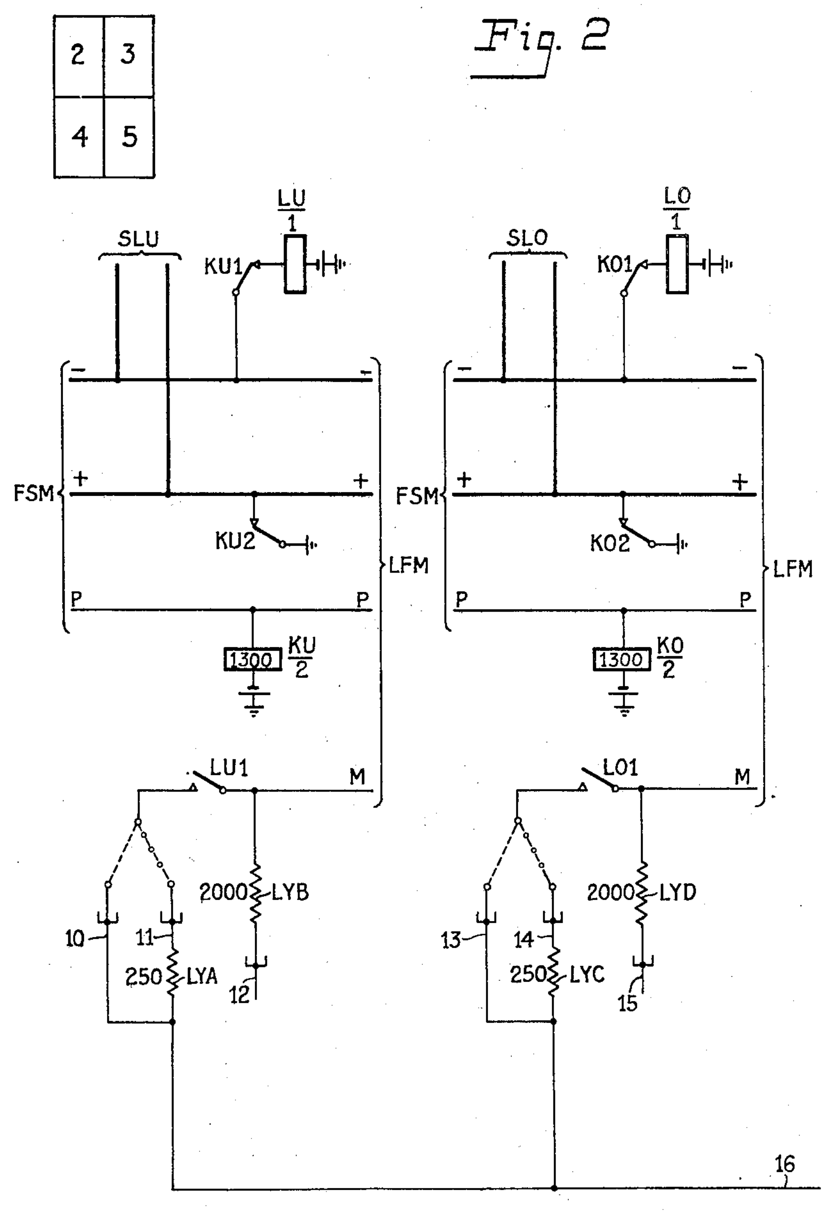
Figure 3:
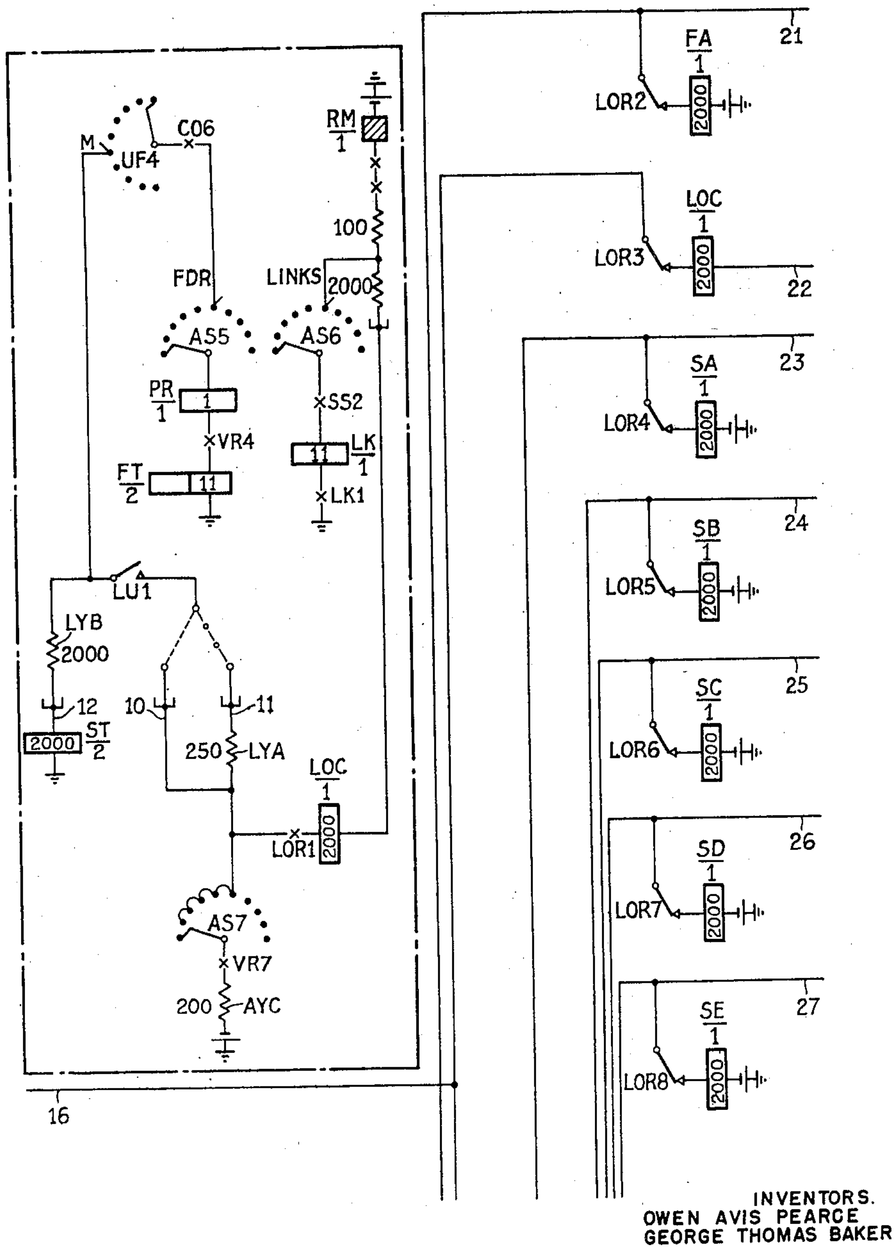

Figs. 2–5 when arranged in the manner indicated in Fig. 2 show circuits of two subscribers' line equipments and of the local and special service link finder allotting equipment and associated start relays. In Fig. 3 an explanatory inset is included to simplify the understanding of the finding operations involved on origination of a local call.

Figure 6:
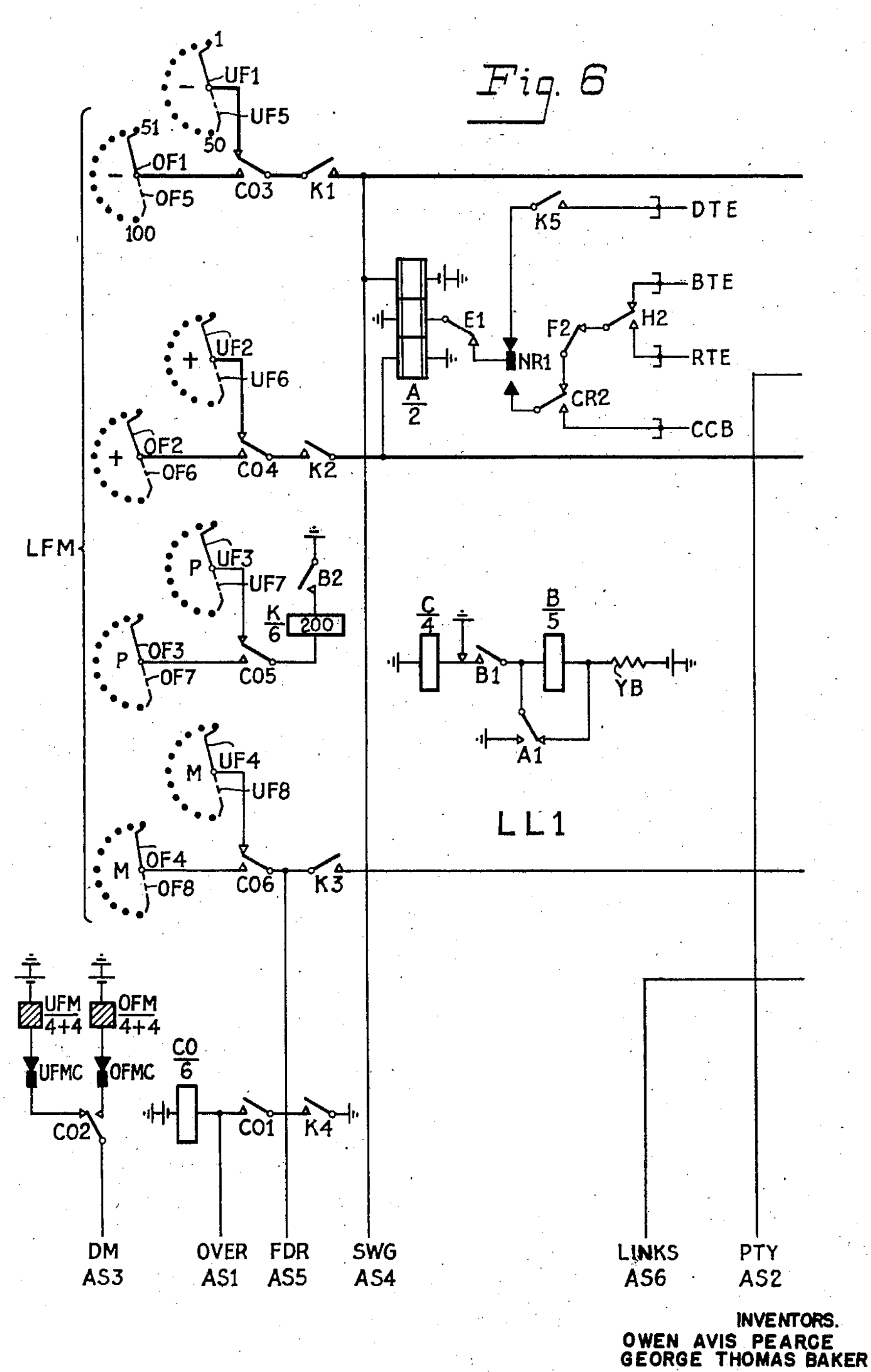
Figure 7:
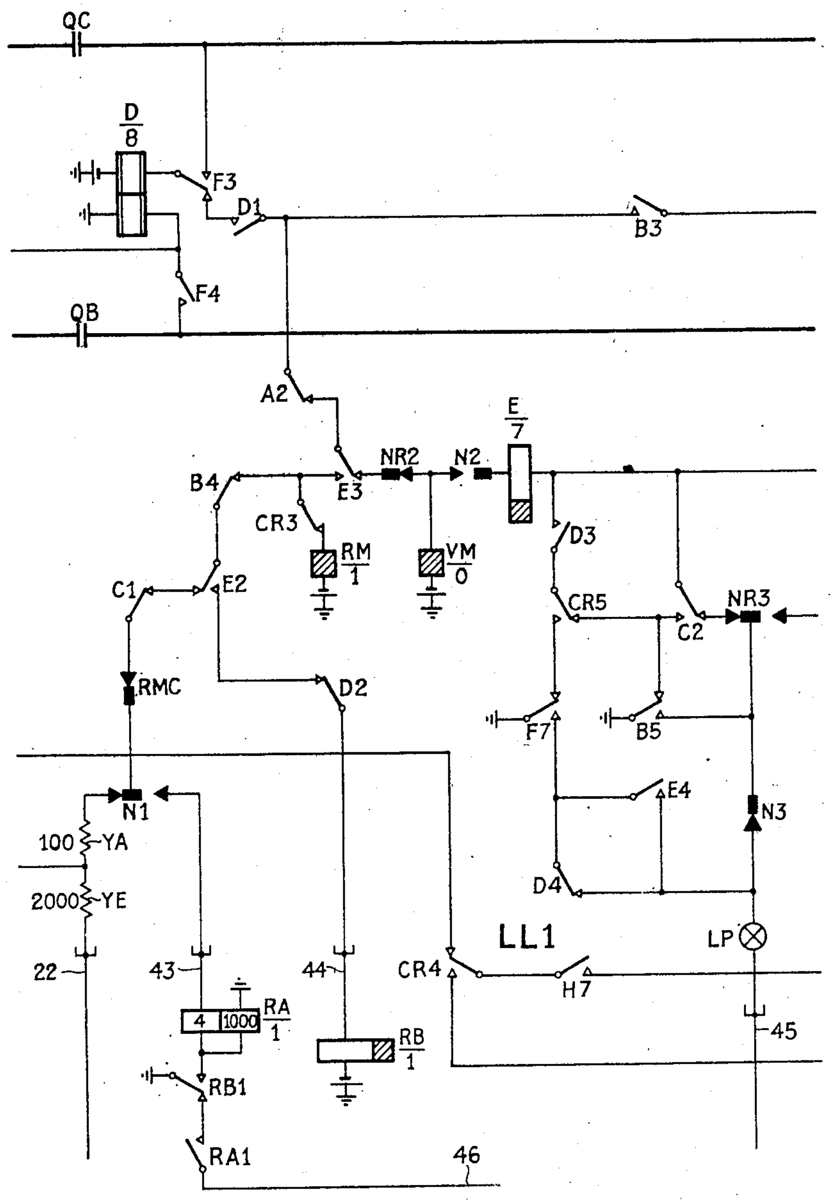
Figure 8:
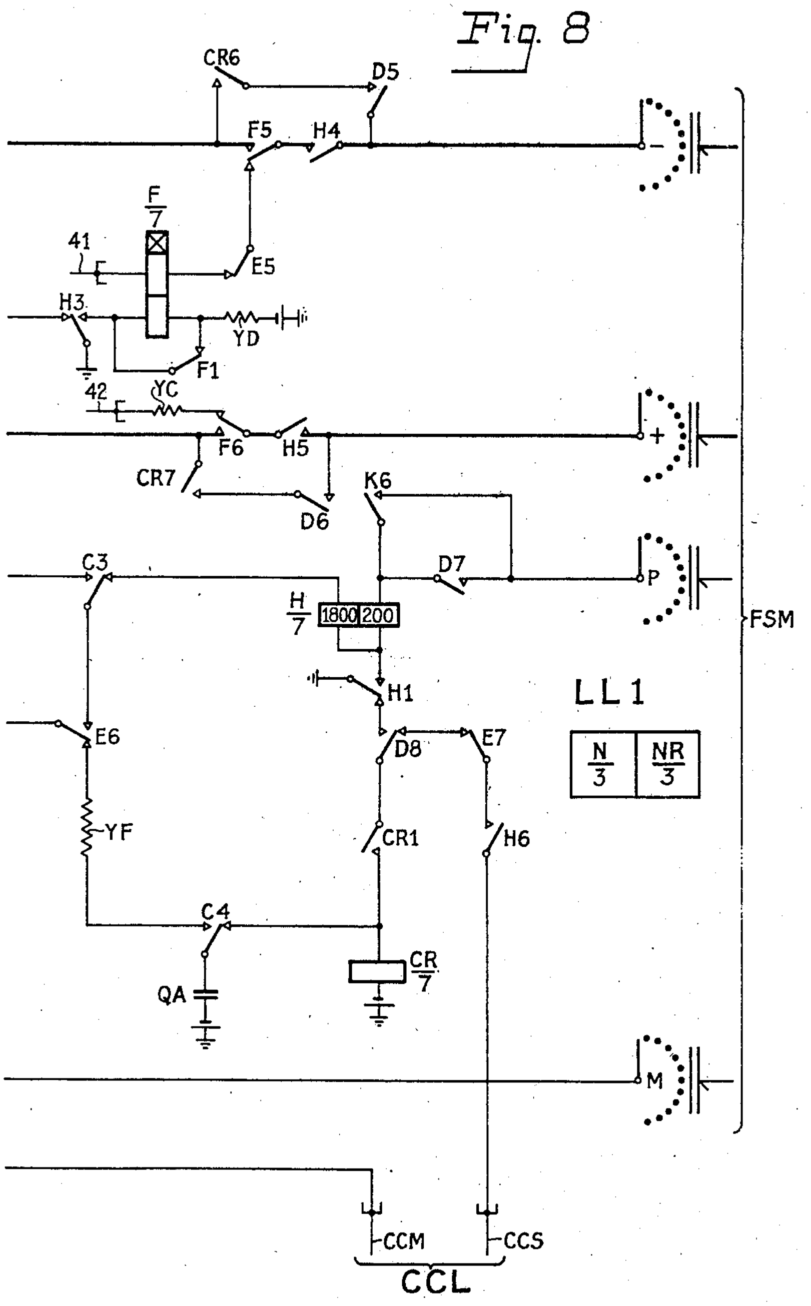

Figs. 6, 7 and 8 when arranged side by side with Fig. 6 on the left show the circuit of a local finder/connector link, hereafter referred to as a local link.

Figure 9:
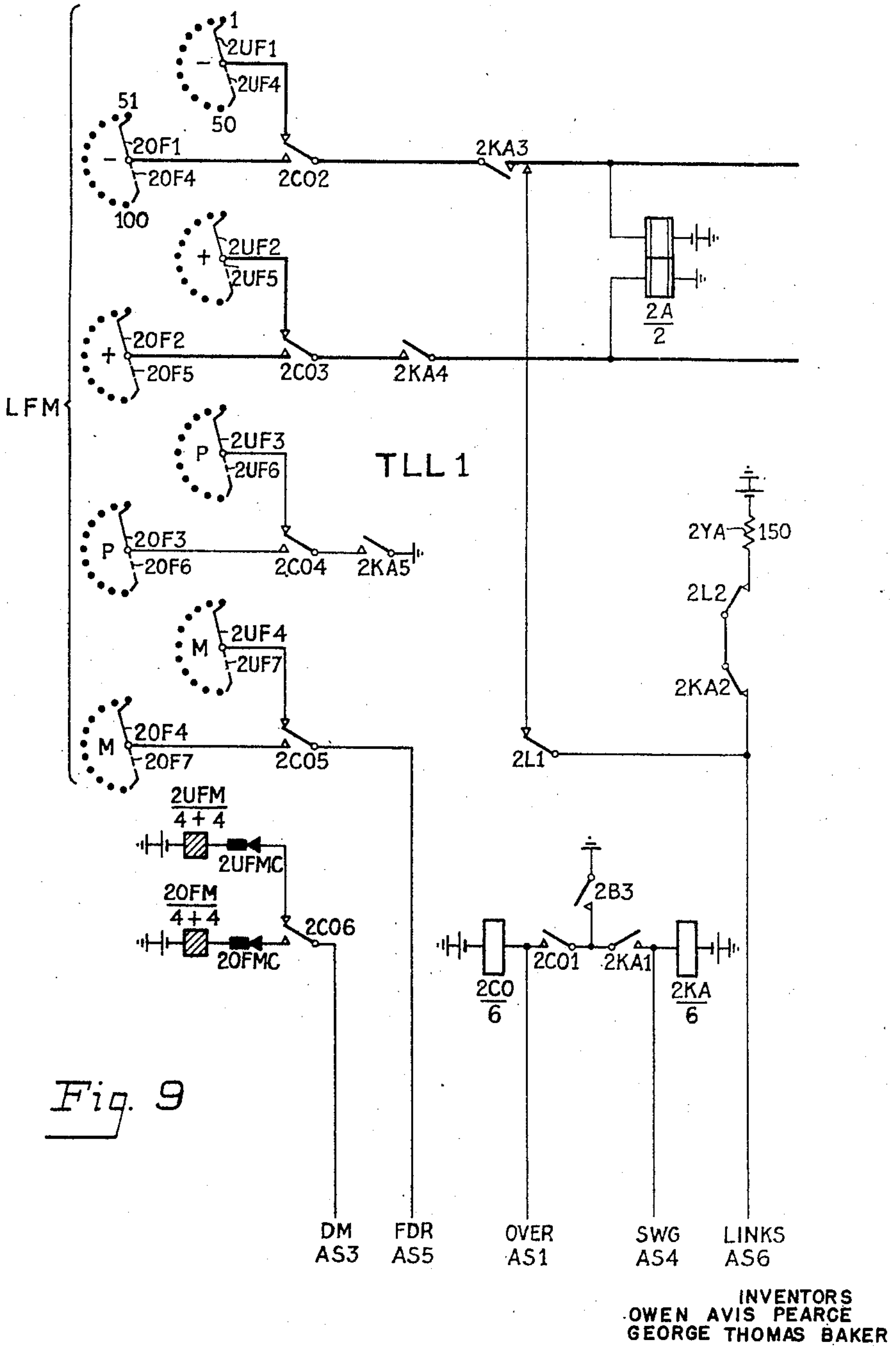
Figure 10:
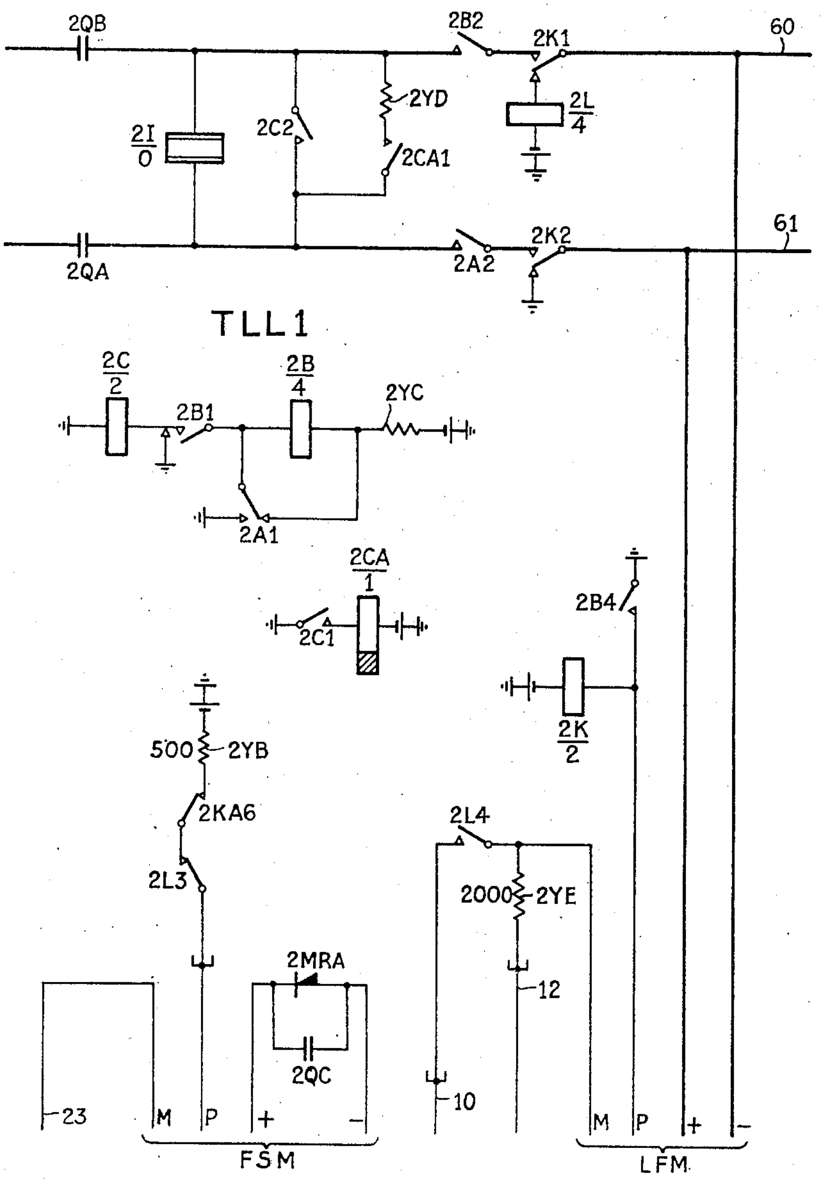

Figs. 9 and 10 when arranged side by side show the circuit of a tie line service link.

Figure 11:
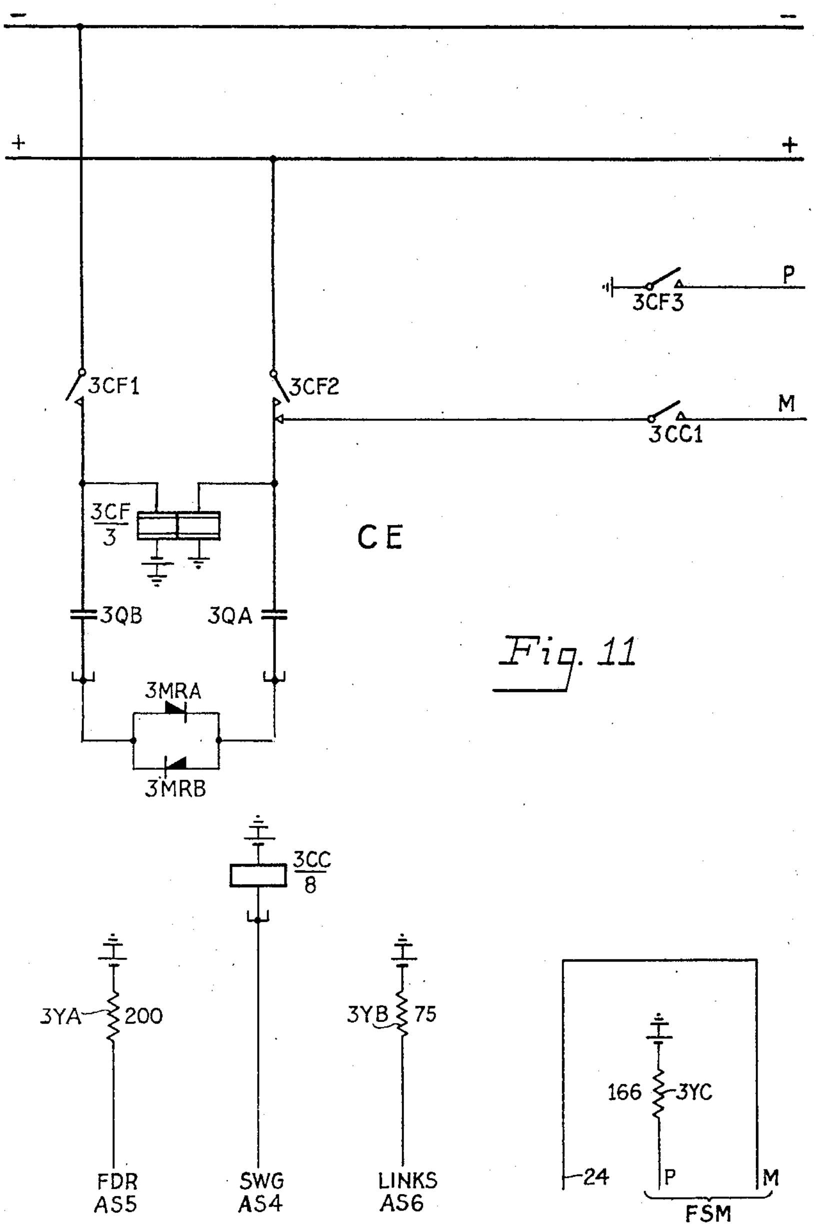
Figure 12:
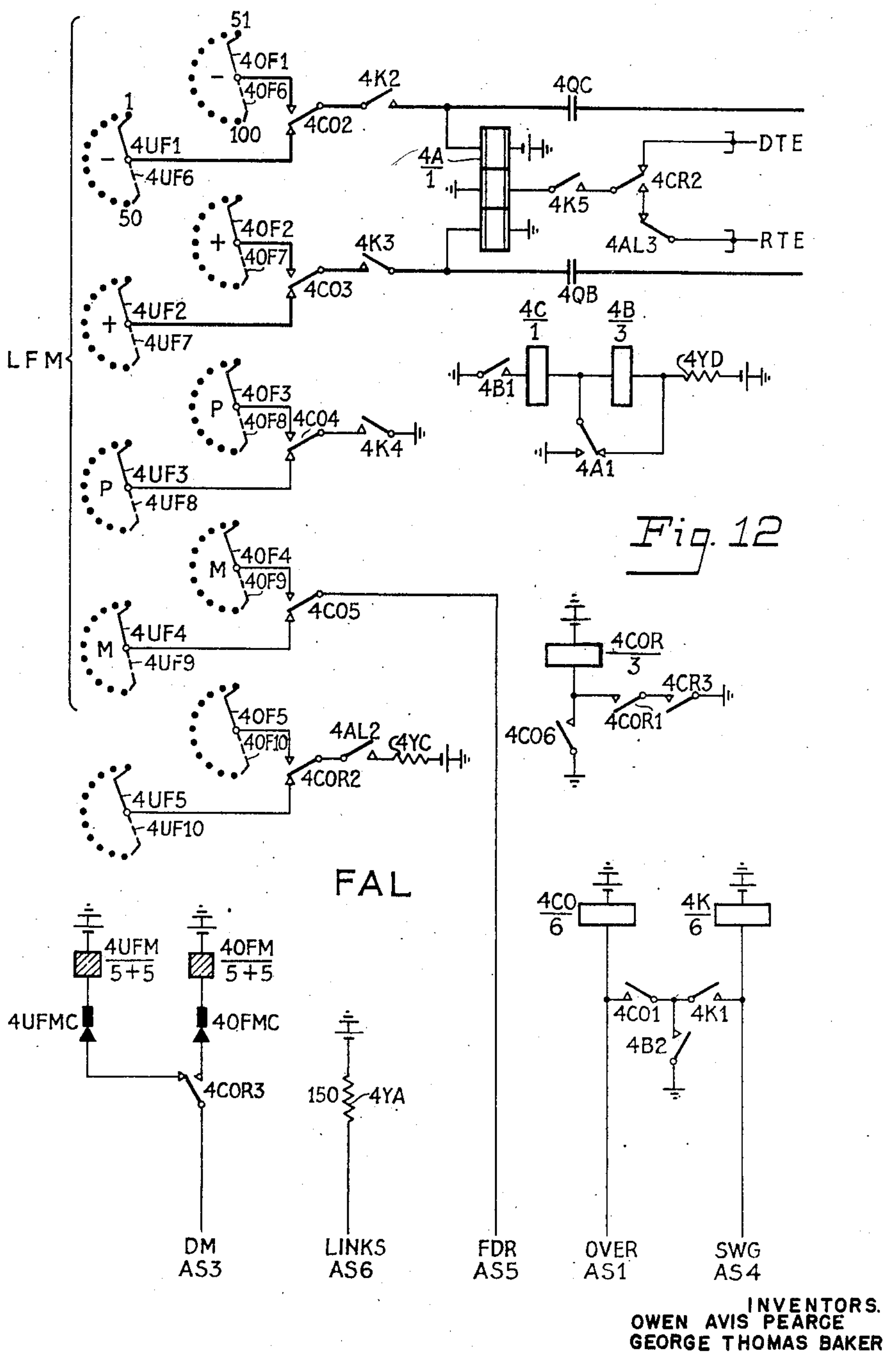
Figure 13:
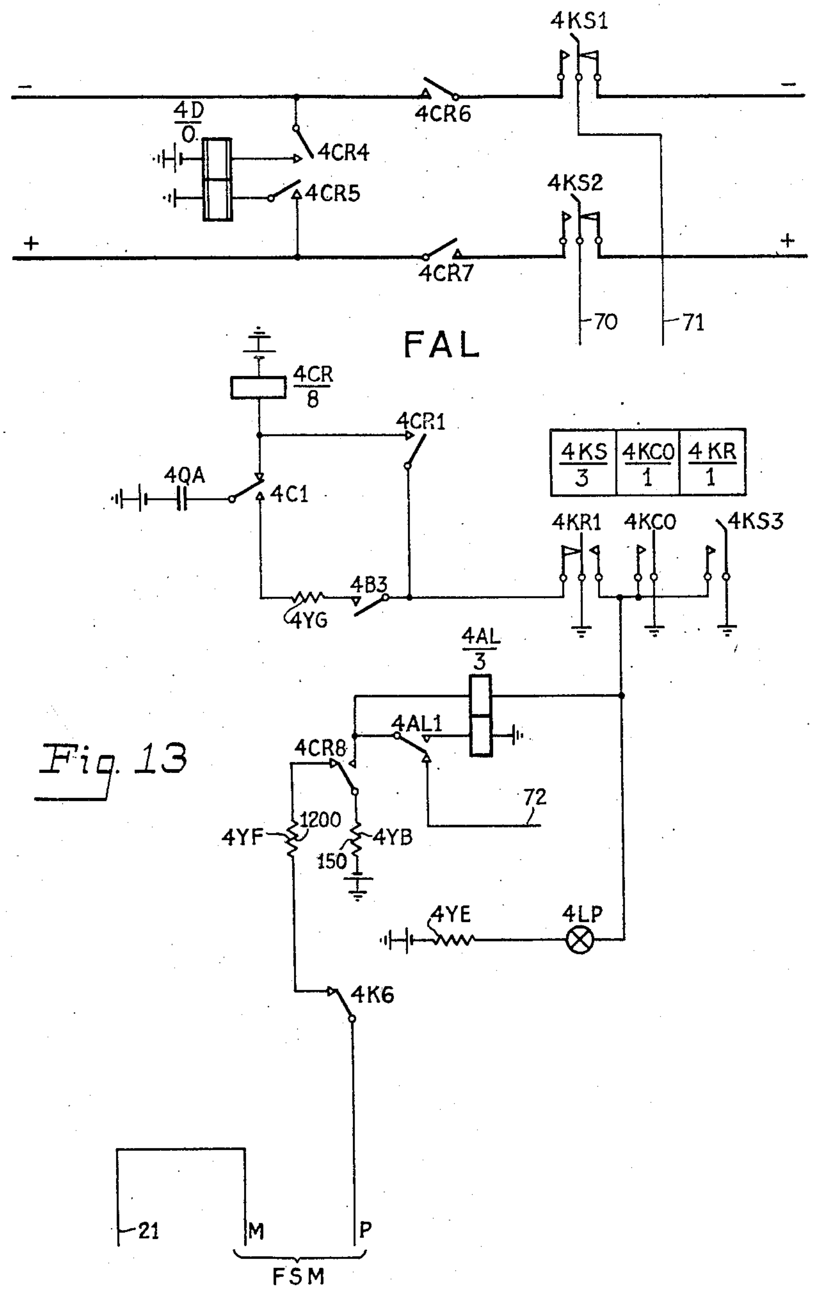

Fig. 11 shows the circuit of a conference service equipment. Figs. 12 and 13 when arranged side by side show the circuit of a fire alarm service link.

Figure 14:
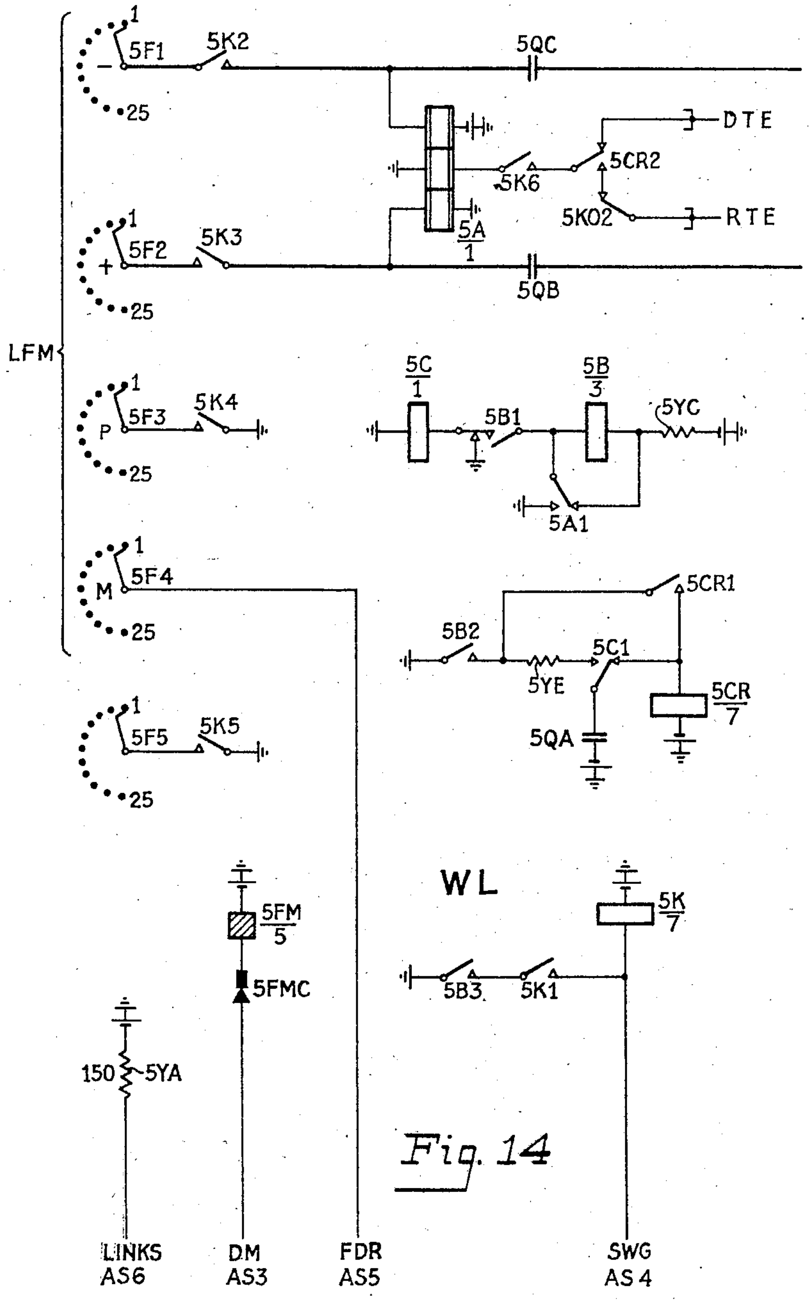
Figure 15:
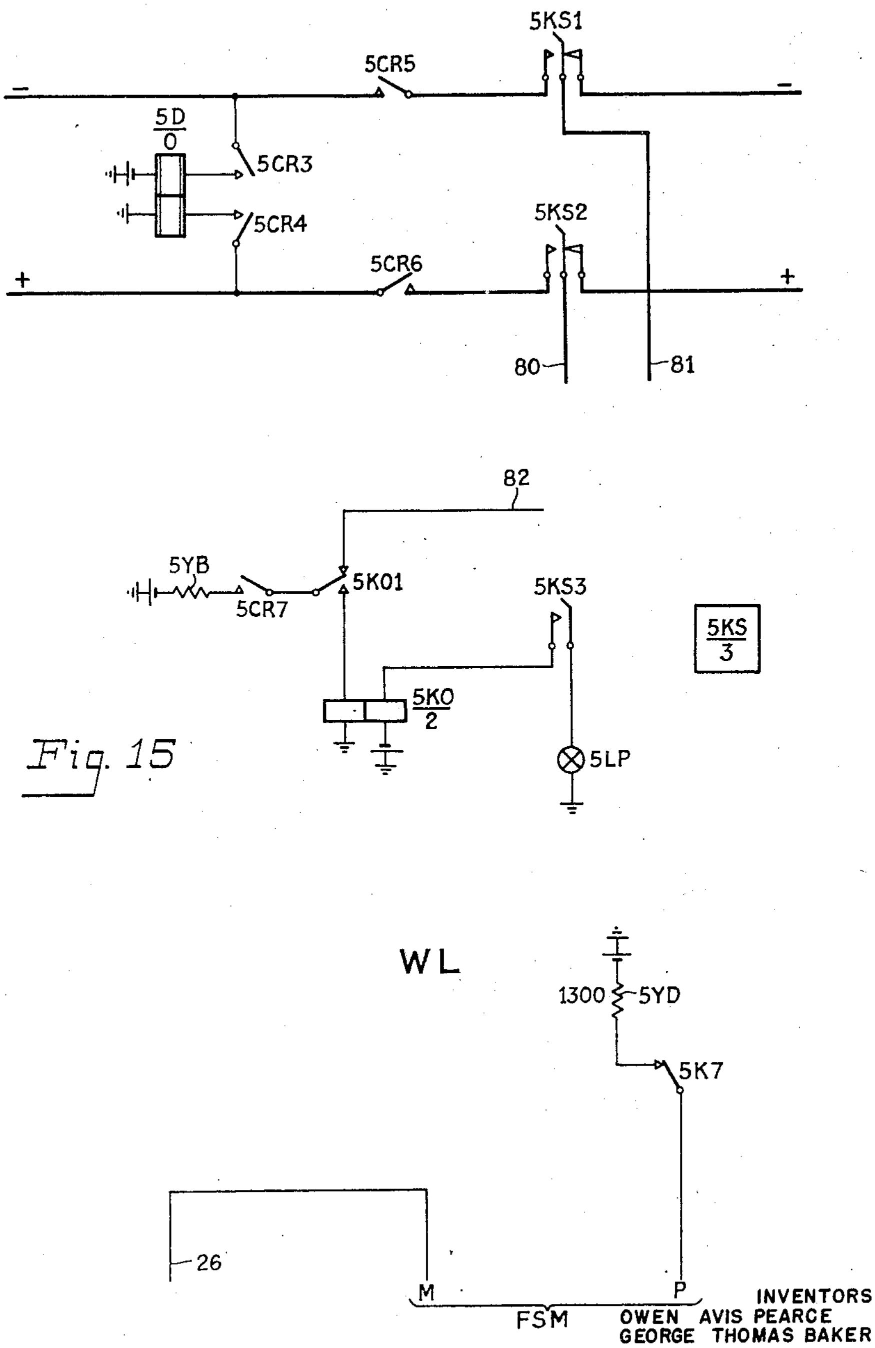

Figs. 14 and 15 when arranged side by side show the circuit of a watchman's service link.

Figs. 16–19 when arranged side by side in order show the circuit of a code call service link.

Considering first the general design of the board, it is build up from a number of identical units each comprising say 35 subscribers' line equipments and four local links. Referring to Fig. 1, each link such as the one designated LL employs at least one 50-point uniselector finder switch and a 100-point two-motion connector or final selector switch. Where the capacity of the board may exceed 50 lines, two finders per link are provided and respectively serve subscribers in the "under 50" and "over 50" groups into which the 100 lines of the board are divided. Two allotting equipments, such as the one designated AE are provided for any size of board up to 100 lines, each one normally serving its own group of 50 lines but capable, under fault conditions, of serving the other group also.

When a calling subscriber such as SL1 initiates a call, the line equipment LE extends a start signal to the appropriate allotting equipment such as AE to cause a local link such as LL to associate itself with the calling line, the required one of the two finder switches shown being determined in accordance with the particular 50-line group in which the calling party is located. The setting up of local calls is performed in orthodox manner by dialling on to the local link connector switch.

As regards the setting up of certain special service calls which is effected either by dialling a special code number or by dialling a normal P. A. X telephone number followed by a suitable extra digit, the finder switches of both local and special service links are adapted to be allotted by each common allotting equipment, discrimination as to the allotting function to be performed by this equipment being effected by providing a separate discriminating relay for each service concerned. Consequently, as will be appreciated from the ensuing description, on receipt of the appropriate digit or digits the allotting equipment causes the special service link concerned to associate itself with the calling line on a finder basis, whereupon the local link previously employed is released for further common use. Typical special service links which operate on this principle and are shown in Fig. 1 include the tie line service link TLL and an unspecified special service link SSL which might be a fire alarm service link or a watchman's service link.

As regards conference facilities each subscriber requiring this feature has associated with his line a conference equipment such as CE, such equipments providing an individual battery feed for conversation under conference conditions and giving access to a common point whereby interconnection can be effected. Conference subscribers requiring to effect a conference call will dial a conference code number into the local links at the appointed time and are then switched through to a common talking circuit by way of their conference equipments and the local links are released for further use.

Considering now the operation of the various circuits of Figs. 2–19, in these circuits, which are assumed to be operated off a 50 volts supply, typical resistance values of certain relay windings and resistors are shown for general guidance. The mechanism of the connector switch in each local link is of the type disclosed in the patents to Robert N. Saxby, No. 2,028,689 granted January 21, 1936, and No. 2,124,750 granted July 26, 1938.

Figure 4:
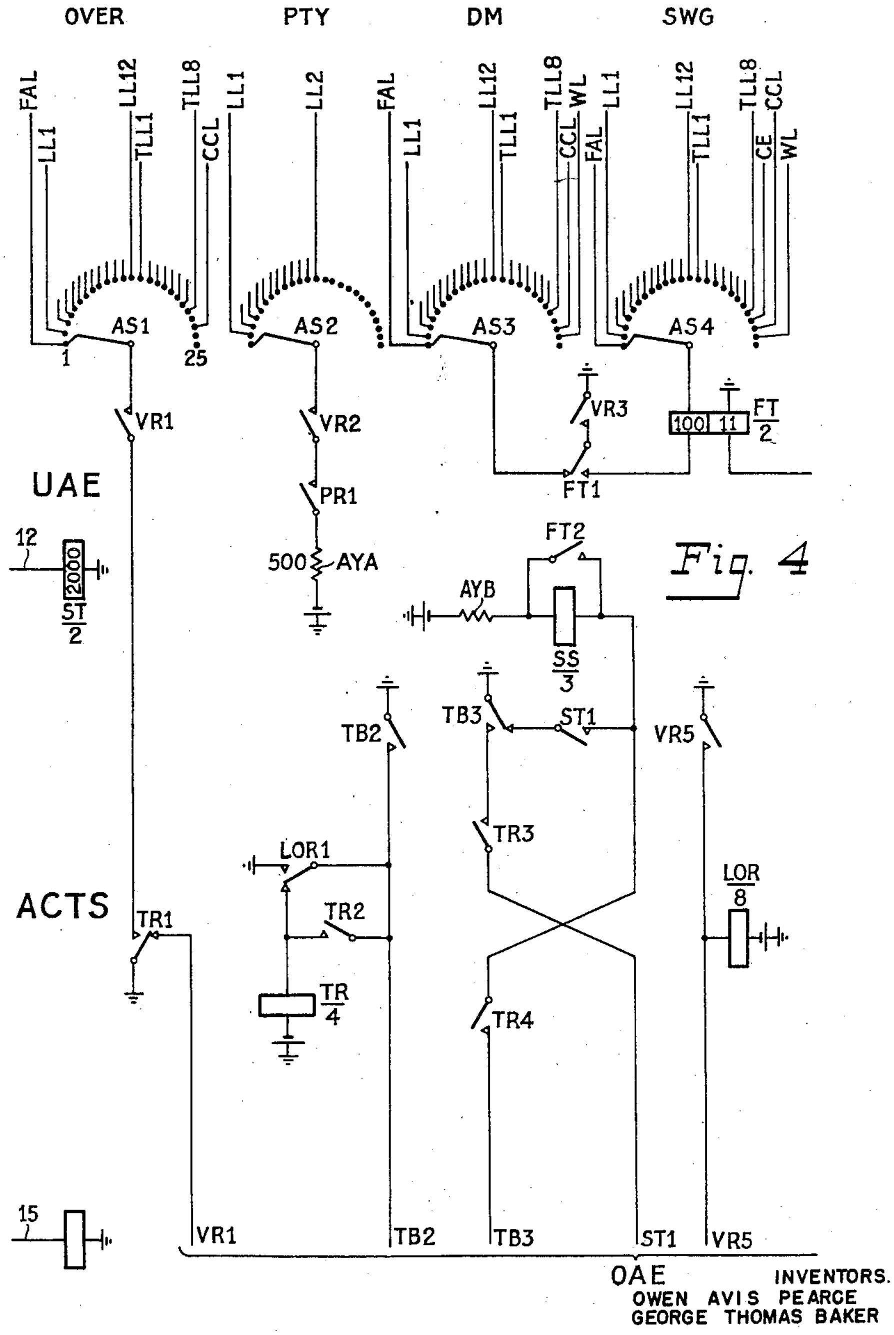
Figure 5:
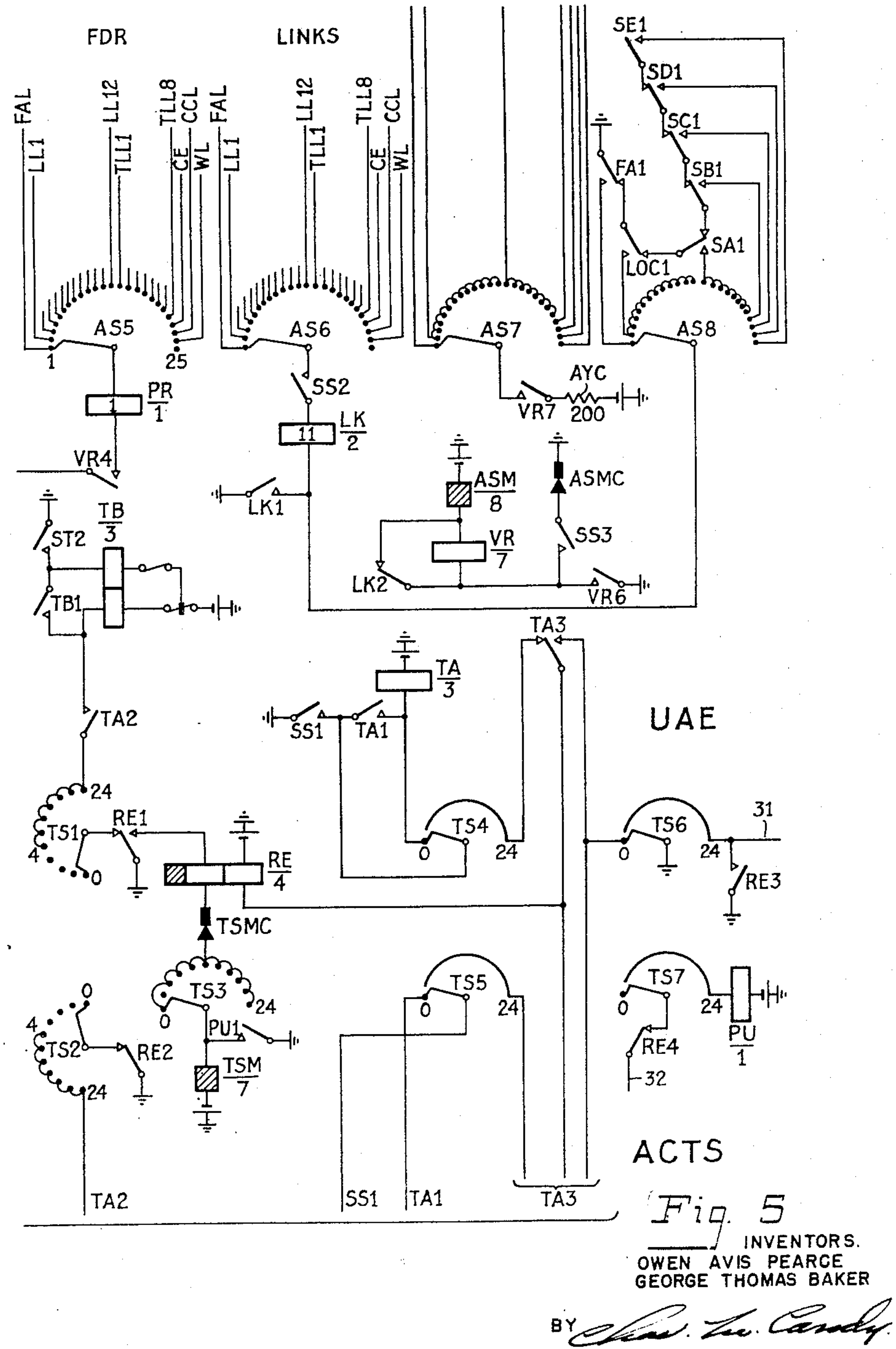

Referring now to Figs. 2–5, Fig. 2 shows the line circuits of "under 50" and "over 50" subscribers, the lines of which are respectively designated SLU and SLO. In the upper part of Figs. 4 and 5 is shown the "under 50" allotting equipment UAE, while in the bottom part is shown the set of leads extending into the "over 50" allotting equipment OAE. In the centre is shown the control and timing relay set ACTS including the switch TS which serves both of the allotting equipments UAE and OAE. Each allotting equipment is provided with an 8-level uniselector such as AS, the banks of the uniselectors in the two allotting equipments being multipled together and sets of leads such as OVER, PTY, LINKS, extending therefrom to the local and the various special service links. The twelve local links with which the board, when at full capacity, will be provided, are designated LL1–LL12, the eight tie line service links are designated TLL1–TLL8, while the fire alarm, code call and watchman's service links are designated FAL, CCL and WL respectively. A set of leads also extends from the multipled allotting switches to the common access portion of the circuits of the various conference equipments CE which are provided on the board.

Fig. 3 shows the set of service discriminating relays which serve both of the allotting equipments UAE and OAE, a separate relay being provided for the local links and for each special service with which the board is provided.

Considering now the setting up of a local call from a non-priority subscriber in the "under 50" group, for this purpose reference should be had to Figs. 2–5 and to the local link circuit of Figs. 6–8.

When the subscriber's line such as SLU, Fig. 2, is looped, relay LU operates and since the subscriber is assumed not to have priority facilities, relay LU in operating will complete a circuit to operate the allotting equipment UAE start relay ST, Fig. 4, and the service discriminating relay LOC, Fig. 3, in series as follows: earth, winding of relay ST, common lead 12, resistor LYB, Fig. 2, contacts LU1, chain-dotted cross-connection to common lead 11, resistor LYA, lead 16, contacts LOR3 (Fig. 3), winding of relay LOC, common lead 22 and resistors YE and YA, Fig. 7, in each local link and contacts N1, RMC, C1, E2, B4 and CR3 to battery via the connector switch rotary magnet RM, (non-operative in this condition).

Relay ST at contacts ST1 brings up relay SS, which at contacts SS2, Fig. 5, connects relay LK up to the allotter switch LINKS test wiper AS6 and at contacts SS3 completes a self-interrupted driving circuit for the allotter switch magnet ASM via its interrupter contacts ASMC. Contacts ST2 and SS1 will be dealt with later in connection with the allotter control and timing relay set ACTS.

Relay LOC, Fig. 3, at contacts LOC1, Fig. 5, connects earth to contacts 2–13 of bank AS8 so that earth will be applied via wiper AS8 to relay LK while the switch AS advances its wipers over contacts extending to the twelve local links LL1–LL12. At the same time contacts LOC1 ensure that other link circuits having less priority as regards finding than the local links are unable to exert any control over the allotter at this time. It will be noted, however, that the fire alarm link, the service discriminating relay for which is designated FA, can always take priority, since the earth to the other relay contacts is communicated via contacts FA1.

Switch AS proceeds to rotate its wipers over the twelve local links, and when a free one is found such as LL1 disclosed in Figs. 6–8, relay LK operates quickly in series with the idle marking battery which is connected up to allotter bank AS6 over the following circuit: battery, magnet RM, Fig. 7, contacts CR3, B4, E2, C1, RMC and N1, resistor YA and the LINKS lead which extends to contact 2 on bank AS6. Owing to the low resistance (11 ohms) of relay LK, this provides an immediate guard on the outlet seized. This relay in operating, at contacts LK1 completes a local locking circuit, and at contacts LK2 disables the magnet ASM driving circuit by introducing high resistance relay VR in circuit therewith.

Relay VR in operating in series with magnet ASM, at contacts VR3, Fig. 4, applies earth via contacts FT1 and wiper and bank AS3 to the DM lead so as to complete a self-interrupted driving circuit for the magnet UFM, Fig. 6, of the "under 50" finder switch UF in the selected local link. At contacts VR4, Fig. 5, it extends earth via the low resistance windings of relays FT and PR in series and wiper and bank AS5 on to the FDR lead which connects with the local link finder switch wiper UF4, Fig. 6. Contacts VR5 bring up relay LOR, Fig. 4, which at contacts LOR2–LOR8, Fig. 3, opens the circuits of all the service discriminating relays. Contacts VR6, Fig. 5, lock relay VR, while contacts VR7 apply a 200-ohm marking battery via resistance AYC and wiper and bank AS7 to the start lead 16, Fig. 3, over which it extends via the 250-ohm resistance LYA, Fig. 2, common lead 11 and contacts LU1 to the M lead of the calling line circuit which is connected to a particular set of contacts in the bank multiple LFM of the various local link "under 50" finder switches. This marking battery potential furthermore holds relay ST via resistor LYB and common lead 12.

The selected local link finder UF proceeds to rotate its wipers and when wiper UF4 encounters the 450-ohm marking battery via resistors LYA, Fig. 1, and AYC, Fig. 3, relay FT, Fig. 4, will operate but relay PR, Fig. 5, will fail to operate owing to the resistance of the circuit. Relay FT at contacts FT1 opens the earth supply to the DM lead so as to halt the movement of the finder switch UF and also extends earth via its left-hand winding and wiper and bank AS4 and lead SWG to hold itself in series with relay A, Fig. 6, in the local link which operates, while contacts FT2 short-circuit and release relay SS. The 12-ohm resistance of relays FT and PR applied to lead FDR in extending back via wiper and bank OF4, Fig. 6, and the M lead to the calling line circuit short-circuits and releases relay ST, Fig. 4, which was initially operated over lead 12 and resistance LYB, Fig. 2. Relay SS on releasing at contacts SS2, Fig. 5, opens the circuit of relay LK which releases, whereupon contacts LK2 short-circuit relay VR. Relay VR commences to release slowly and during this time magnet ASM is energised. The various operations involved will be better appreciated from the inset diagram in Fig. 3 which shows only the elements immediately concerned.

During this time relay A, Fig. 6, in operating will have brought up relay B and this relay at contacts B1 prepares a circuit for relay C, at contacts B2 applies earth via relay K to wiper UF3, at contacts B3, Fig. 7, prepares an impulsing circuit for the connector switch vertical magnet VM, at contacts B4 disconnects the incoming idle marking battery circuit via magnet RM, and at contacts B5 lights the supervisory lamp LP via battery-connected delayed alarm equipment connected to common lead 45.

Relay K on being connected to wiper UF3 now operates over the P lead in series with relay KU, Fig. 2, of the calling line circuit. Contacts K1 and K2 complete a holding circuit for relay A via the calling subscriber's loop, while contacts K5 complete a balanced dial tone circuit from the earthed dial tone source connected to common lead DTE. Relay KU, Fig. 2, at KU1 releases relay LU and at KU2 removes earth from the positive lead. Contacts LU1 thereupon open a point in the operating circuit of relay FT, Fig. 4, which, as previously mentioned, had been initially completed via lead FDR, finder wiper UF4 and the M lead, but this relay remains held over the SWG lead in series with the local link A relay. When relay VR releases, contacts VR3 open the holding circuit of relay FT in series with relay A, the latter now continuing to hold over the calling party's loop. At contacts VR4 a further point in the operating circuit of relay FT is opened, at contacts VR6 magnet ASM is de-energised to step on the AS switch wipers to the next position and at contacts VR7 the marking battery circuit via resistor AYC is opened.

All relays in the allotting equipment UAE are now normal, and this equipment is therefore ready for further common use. Relay KU in the local line circuit and relays A, B and K in the local link remain held.

The calling subscriber now dials the required number and assuming a local subscriber is required, a two-digit number will be dialled.

When the first digit is dialled, relay A is responding repeats the impulses to the vertical magnet VM, Fig. 7, at contacts A2, the switch wipers being thereupon raised to the corresponding level. Relay C operates on the first release of relay A and relays B and C then hold by periodic short-circuiting during the train. On the first vertical step, the switch off-normal spring set N is mechanically operated and at contacts N1, Fig. 7, prepares the release alarm circuit over common lead 43, at contacts N2 prepares a circuit for relay E and at contacts N3 disconnects the circuit for lamp LP.

At the end of the train of impulses relay B holds and relay C releases slowly. On the release of relay C, relay E operates in series with magnet VM (non-operative in this circuit) and at contacts E1 disconnects the dial tone circuit, at contacts E2 further prepares the release alarm circuit via common lead 44, at contacts E3 prepares the impulsating circuit to the switch rotary magnet RM, and at contacts E6, Fig. 8, prepares a circuit for relay H. The second digit dialled is effective on magnet RM, whereupon the switch wipers are rotated over the selected level, relays B, C and E holding operated during the train. On the first rotary step the rotary off-normal spring set NR is mechanically operated and at contacts NR1, Fig. 6, further disconnects the dial tone circuit and prepares a circuit for the application of busy or ringing tone over common leads BTE or RTE respectively, at contacts NR2 disconnects the vertical magnet circuit and at contacts NR3 further prepares a circuit for relay H and disconnects any re-operating circuit for relay E.

At the end of the train relay B again holds and relay C releases slowly. On the release of relay C, relay E commences to release slowly and relay H thereupon tests the called line P lead. Assuming the line is free, relay H operates in series with the subscriber's cut-off relay and at contacts H1 short-circuits its 1800 ohm winding to provide a low resistance guarding potential and also to enable the cut-off relay to operate and so to disconnect the line relay from the line. At contacts H2, Fig. 6, ringing tone is returned to the calling party via common lead RTE, at contacts H3 a locking circuit is prepared for the ring trip relay F, while at contacts H4 and H5 ringing is applied via common lead 41 and the upper winding of relay F to the called line, the return circuit being completed via the battery connected common lead 42. At contacts H6 a circuit is prepared to the code call equipment and at contacts H7 the M lead is extended through from the called to the calling side of the circuit for the purpose of selective finding as will be described later.

When the called subscriber replies, relay F operates sufficiently to open its break-first contacts F1, whereupon the lower winding comes into action to cause it to operate fully and in so doing at contacts F2, Fig. 6, it cuts off the ringing tone circuit and at contacts F3–F6, Figs. 7 and 8, it connects battery feed to the called party via the windings of relay D which operates. Contacts of relay D are without effect; as far as the present circuit operations are concerned.

At the end of conversation if the called subscriber hangs up first, relay D releases and at contacts D4 lights the supervisory lamp LP via the delayed alarm equipment connected to common lead 45.

When the calling party hangs up, relay A releases, whereupon relay B commences to release slowly and relay C re-operates. On the release of relay B, relay E re-operates and relay K, Fig. 6, and relay KU, Fig. 2 release, whereupon relays F and H also release. Relay RB, Fig. 7, operates on the operation of relay E and short-circuits the 1000-ohm winding of relay RA. On the release of relays C and E in turn a self-interrupted driving circuit is completed for the rotary magnet RM via the 4-ohm winding of relay RA and earthed contacts RB1. Accordingly the wipers are rotated clear of the banks, after which they fall and rotate under the banks by spring tension back to their normal position where the off-normal contacts N1 open and disconnect the release circuit. During this time relay RB remains held due to its slug. If the switch fails to release, on the release of relay RB relay RA holds operated over its two windings in series with the rotary magnet RM, and at contacts RA1 completes a circuit to alarm equipment connected to lead 46.

If the calling party hangs up first, relays A, B, K, KU and C release in turn and relay E is operated and at contacts E4 lights the supervisory lamp LP. When the called party subsequently hangs up, relays D, H, F and E release in turn and the switch is restored to normal under the control of relays RA and RB as just described.

Assuming now that the called subscriber is found to be busy, relay H will fail to operate during the slow release time of relay E and a circuit will then be completed via contacts E1, Fig. 6, to return busy tone to the calling party from the busy tone source connected to common lead BTE. When the called party hangs up the switch restores to normal as described, the only difference being that in this instance relays F and H will be already normal when relay B releases.

It will now be assumed that the calling party has priority facilities in which case relay LU in operating will at contacts LU1 connect the M lead direct to lead 16 via the dotted connection and common lead 10 instead of via resistance LYA as in the case of a non-priority subscriber. Hence when the local link finder UF connects with the calling line, both the series testing relays FT and PR in the allotting equipment UAE will operate. Relay FT functions as already described, while relay PR at contacts PR1 (Fig. 4) extends battery via resistor AYA, contacts VR2 and wiper and bank AS2 and the PTY lead to energise the local link relay D, Fig. 7, which at contacts D1 locks over its upper winding via contacts B3 and H3 to earth.

In response to the dialling of the two local digits the circuit again functions as described and if the line is free, relay H at contacts H3 disconnects the locking circuit of relay D which subsequently re-operates over the called subscriber's loop in the usual manner after the operation of relay F.

If the line is busy, however, the calling party on receiving busy tone, since he has priority facilities may effect connection with the busy wanted party by dialling a further digit such as 0. At this time relays A, B, K and D will be operated and in response to further dialling relay C will re-operate and complete a charging circuit for capacitor QA, Fig. 8, during the train via resistor YF, contacts E6, NR3 and B5 to earth.

At the end of the train relay C at contacts C4 connects the charged capacitor QA across relay CR. If the further digit has been of sufficient duration, the charge accumulated on capacitor QA will energise relay CR sufficiently to close its make-first contacts CR1, after which it fully operates via these contacts and contacts D8 and H1 to earth. Relay CR also at contacts CR3 disconnects magnet RM, and at contacts CR5 re-operates relay E, whereupon at contacts E1 the tone circuits are disconnected. At contacts CR6 and CR7 the speaking leads are connected via contacts D5 and D6 through to the parties already in conversation. If the incoming call is urgent, the parties in conversation should now hang up, whereupon since relay E will have prepared a circuit for relay H, at contacts E6, this relay will now operate in series with the called party's cut-off relay. Relay H at contacts H1 disconnects relay CR, whereupon owing to the opening of contacts CR5 relay E commences to release slowly. On the release of relay E, contacts E5, Fig. 8, complete a circuit for ringing the called party. When the called party answers, relay F trips the ringing in the usual manner, and relay D then operates over the called loop.

In connection with the measurement of the extra digit, instead of measuring a minimum duration by means of relay C, counting arrangements might be employed in the local link whereby this digit must be of some predetermined value before priority cut-in can be effected. The use of an extra digit to provide a control feature for a calling party avoids the need of push buttons or the like which would otherwise be required on or in association with subscribers' telephone instruments. It will be appreciated that manual control of the priority cut-in feature has the effect of preventing a lower ranking executive from automatically cutting in on a busy higher ranking executive.

It will have been noticed that the priority marking is extended to the local link via the allotter circuit at the time of finder switching. This obviates the need for special signalling arrangements from the calling line circuit through to the local link line finder.

Dealing now with a call originated by a subscriber in the "over 50" group, when line SLO, Fig. 2, of such a subscriber is looped, relay LO operates and functions in similar manner to relay LU except that instead of relay ST, Fig. 4, in allotting equipment UAE being brought up in series with relay LOC, Fig. 5, an equivalent relay in the "over 50" allotting equipment OAE will be operated over common lead 15, Fig. 2, in series with relay LOC.

When the allotter switch associated with equipment OAE finds a free local link and relay VR operates, contacts VR1 come into operation in this instance to extend earth from contacts TR1, Fig. 4, in the timing set ACTS on to allotter wiper AS1 via which the earth extends to the OVER lead extending to the local link. If the link of Figs. 6–8 has been taken into use, relay CO, Fig. 6, will be operated over this lead and will bring the "over 50" finder switch OF into operation instead of UF. Thereafter the call proceeds as for the "under 50" case already described.

More detailed consideration will now be given to the inter-relation of the "under 50" and "over 50" allotting equipments UAE and OAE together with the common allotter control and timing relay set ACTS. Regardless of the size of board both allotting equipment UAE and OAE are provided, the arrangements being that each allotting equipment normally operates in respect of its own group of up to 50 lines but is capable of operating in the other group under fault conditions. Failure to find on the part of a local link finder within a period of the order of say three seconds will cause automatic changeover conditions to be instituted from one allotting equipment to the other, while a blown fuse in one group of lines will bring about instantaneous changeover of the other alotting equipment to enable it to operate in this group.

Referring now to Fig. 4, on the operation of relay SS in response to the operation of relay ST from a calling "under 50" line circuit, contacts SS1, Fig. 5, extend earth via the timing switch wiper and bank TS4 in the home position to bring up relay TA. Relay TA in operating locks via its contacts TA1, prepares a circuit for relay TB at contacts TA2 and brings up relay RE at contacts TA3 from ear on wiper TS6. Relay RE in operating, at contacts RE1 steps the timing switch TS off the home position via the magnet interrupter contacts TSMC, and at contacts RE3 applies earth to the ringing machine start lead 31 so that when connection is subsequently effected to the called party the ringing of his bell can only take place for a predetermined period as determined by the cycle time of the TS switch. Switch TS in advancing its wipers from the home position 0 opens the circuit of relay RE at wiper and bank TS6 and at the same time maintains an earth on the ringing machine start lead 31. Relay RE on restoring, at contacts RE1 and RE2 connects earth to wipers TS1 and TS2 and at contacts RE4 connects relay PU to a suitable source of interrupted earth supply over lead 32, the earth supply comprising say 750 m. s. pulses at 750 m. s. intervals. Relay PU in operating re-energises magnet TSM and on next releasing de-energises the magnet so as to advance the switch wipers to position 2. The switch wipers continue to advance step-by-step under control of relay PU and when position 4 is reached, which will occur after a period of the order of three seconds, earth will be extended over wiper and bank TS1 to bring up relay TB if by this time the local link finder switch has not found the calling line and hence has not initiated release of the allotting equipment UAE and its relays ST, SS, LK, VR, FT and TA which would have been operated.

Assuming that due to some fault condition the finder has failed to find a calling line, relay TB will now be operated and at contacts TB1 completes a locking circuit for itself, at contacts TB2, Fig. 4, prepares a circuit for the transfer relay TR, and at contacts TB3 disconnects the circuit of relay SS so as to release relays LK, VR and TA, whereupon the driving circuit for the finder switch in the local link is opened. Relay ST remains operated from the calling party's line circuit. On the release of relay VR, relay LOR also releases and relay TR then operates. Relay TR in operating at contacts TR1 removes earth from the lead extending to contacts VR1 in the "over 50" allotting equipment OAE so that this equipment will now serve as an "under 50" allotter, at contacts TR2 locks itself and at contacts TR3 extends earth from operated contacts TB3 to bring up relay SS in equipment OAE.

Equipment OAE now proceeds to select a free local link, whereupon relays LK and VR therein operate in the usual manner and cause the link "under 50" finder switch to hunt for a calling line. Relay SS of equipment OAE in operating also at contacts SS1 extends earth via wiper and bank TS5 and resting contacts TA3 to re-operate relay RE, whereupon at contacts RE1 a self-interrupted driving circuit is completed for magnet TSM and switch TS is therefore caused to rotate through to its home position. In this position, since relay SS is operated, contacts SS1 now extend earth via wiper and bank TS5 to operate relay TA in equipment OAE, and the timing cycle is now re-commenced in the manner previously described in connection with equipment UAE.

If the "under 50" finder in the selected local link succeeds in finding the calling line, relay FT in equipment OAE operates in the usual manner, whereupon relay ST of equipment UAE which has been held from the calling line is released by short-circuiting as previously described, and this relay in releasing brings down relay TB. Relays A and B are operated in the local link and relays SS, LK and VR in the equipment OAE, together with relays LOR and TR in equipment ACTS, are released. Both equipments UAE and OAE now revert to their normal functions and are ready to deal with further originated calls. The timing set ACTS proceeds to advance at slow stepping speed through the remainder of its cycle. If, before it reaches home a further call is originated, relay RE is re-operated via wiper and bank TS4 or TS5, as the case may be, and quickly homes the timing switch TS in readiness for the new timing cycle.

Similar remarks apply in case an "over 50" link finder switch started up from equipment OAE by a calling "over 50" group subscriber fails to find, in which case relay TR in operating causes equipment UAE to function in an "over 50" capacity.

In the event of a fuse blowing in either of the 50-line groups, the relay TB in the allotting equipment concerned will operate on each originated call and will then cause instantaneous changeover to the partner allotting equipment in the manner above described for "failure-to-find" fault conditions.

The allotting switches of equipments UAE and OAE serve also for the distribution of special service traffic in addition to that of the local traffic. Simultaneous calls can arise on both local and special services, the allotting equipments together with the service discriminating relays allocating an order of priority to the various calls in such circumstances. The number of calls which can be simultaneously attended to by the allotting equipments is, of course, limited to the number of such equipments which are provided, namely to two.

Considering now the setting up of a tie line call, a tie line link such as that shown in Figs. 9 and 10 is adapted to be taken into use in response to the dialling of a special code number into a local link. The tie line link on being seized searches for and associates itself with the calling line and then forcibly releases the local link for further common use. For each group of tie lines to a distant P. A. X board a single code number is allocated so that where more than one tie line is involved it is essential to provide arrangements whereby more than one subscriber can switch in simultaneously to the relevant tie line group code number. Conversation between such subscribers must, however, be prevented.

Referring now to Figs. 9 and 10 which show the circuit of link TL1 of a group of eight tie line links TLL1–TLL8, when the code number allocated to this group has been dialled into a local link such as that of Figs. 6–8, the switching relay H, Fig. 8, in the local link tests the incoming P lead of the bracketed group FSM at the bottom of Fig. 10 which is common to all eight tie line links in the group. If any one or more of the eight tie line links is free, the H relay will switch and in so doing will extend ringing current via relay F, Fig. 8, on to the negative and positive conductors of the tie line code number in the final selector multiple FSM. Across these conductors is bridged a metal rectifier 2MRA and a capacitor 2QC, the metal rectifier serving to trip the ringing and bring up relay F. Relay D, Fig. 7, is now connected across the negative and positive leads but this relay fails to operate, since the rectifier is connected up in a non-conductive direction as far as this relay is concerned. The function of capacitor 2QC is to provide a short-circuit across the negative and positive leads as far as speech currents are concerned so that no two subscribers on dialling a tie line group code number can converse with or overhear one another. On the operation of relay H in the local link, a circuit is completed to start up the allotting equipment in the following manner.

Referring now to Fig. 3, battery via the tie line service discriminating relay SA normally extends over contacts LOR4 and lead 23 on to the multipled M contact of the tie line code number in the final selector multiple FSM, Fig. 10, and hence when the local link is set on to this number, battery via relay SA will extend back over the local link connector switch M bank and wiper, Fig. 8, contacts H7 and CR4, Fig. 7, contacts K3 and CO6, Fig. 6, to the local link finder switch wiper which has been set by finding to connect over the finder switch multiple LFM with the M lead of the calling line circuit, Fig. 2. If the subscriber is an "under 50" group subscriber, a circuit will be found via resistor LYB and common lead 12 to earth via relay ST, Fig. 4, in the allotting equipment UAE. Both relays SA, Fig. 3, and ST, Fig. 4, operate over this circuit, relay SA at its contacts SA1, Fig. 5, determining the finding priority of the call in question and marking the tie line link positions 14–21 in the allotting switch banks, and relay ST functioning in usual manner to initiate the stepping of the allotting switch AS. When this switch reaches the group of contacts in its bank associated with the eight tie line links, an earth is connected up to relay LK via bank and wiper AS8 and the allotter switch now performs a test on each one of the tie line links TLL1–TLL8 in turn.

Assuming tie line link TLL1 shown in Figs. 9 and 10 to be free, relay LK will operate quickly over wiper AS6 in position 14 in series with the idle marking battery which will be present on the LINKS lead, Fig. 9, which battery circuit includes one winding of relay 2A and resistor 2YA, relay 2A also operating under this condition.

Relay 2A in operating at contacts 2A1 brings up relay 2B which at contacts 2B4 brings up relay 2K. Relay 2K in operating at contacts 2K1 and 2K2 extends a forward seizing loop via retard 2I on to the associated tie line conductors 60 and 61. At the distant end the line terminates on a normal line relay equivalent to 2L, Fig. 10, and this relay in operating at contacts equivalent to 2L1 and 2L2, Fig. 9, disconnects the idle marking battery from the LINKS lead, and at equivalent contacts 2L3, Fig. 10, disconnects the resistance battery from the P contact of the tie line code number while at equivalent contacts 2L4 it extends earth via the winding of the start relay in the appropriate allotting equipment and a common lead equivalent to 12 (assuming that the tie line links are located in the "under 50" group), resistor 2YE, contacts 2L4 and common lead equivalent to 10 which extends in usual manner to a relay equivalent to LOC, Fig. 3. The equivalent relays ST and LOC bring about the starting up of a local link finder in usual manner and when the calling tie line is found the incoming tie line cut-off relay equivalent to K, Fig. 10, is operated via the finder switch multiple and dial tone is returned over the tie line to the originating P. A. X.

Meanwhile relay LK, Fig. 5, in operating brings up relay VR and this relay at contacts VR7 extends a 200-ohm marking battery via wiper AS7 in position 14 and lead 23 back to the M lead of the calling line circuit whence it extends via resistor LYB, Fig. 2, to hold relay ST. At the same time relay VR brings up relay LOR which opens the circuit of relay SA, Fig. 3, and earth is also extended over wiper and bank AS3 and the DM lead to cause the tie line link circuit "under 50" finder switch 2UF, Fig. 9, to search for the calling line. When the calling line is found, relay FT operates over the FDR lead and via the tie line link finder wiper 2UF4 in the same manner as for a local link line finding operation as previously described, and thereupon disconnects the finder switch magnet driving circuit and at the same time applies earth via its left-hand winding and the SWG lead to bring up relay 2KA, Fig. 9. The allotting equipment UAE proceeds to release in normal manner and relay 2KA in operating locks over contacts 2KA1 and disconnects the idle marking battery circuit from the LINKS lead at contacts 2KA2 and 2KA3, while at contacts 2KA3 and 2KA4 it completes a holding circuit for relay 2A via the calling party's loop and at the same time completes a transmission path via capacitors 2QA and 2QB through to the tie line so that the calling party will receive dial tone from the distant P. A. X board. At contacts 2KA5 it applies earth to the P wiper 2UF3 to hold the calling party's cut-off relay KU, Fig. 2, and at the same time to force down the series holding K relay, Fig. 6, in the local link. At contacts 2KA6, Fig. 10, the resistance battery, normally connected to the incoming P lead of the tie line code number in the connector switch multiple FSM, is disconnected so as to indicate that the link TLL1 is busy to other subscribers attempting to gain access to a tie line. In the event of other tie lines in the group being free, however, such subscribers could of course switch through to the marking batteries extended on to the P lead from the associated links.

Returning to the local link, relay K, Fig. 6, in releasing at contacts K1 and K2 opens the circuit of relay A which thereupon releases and in the previously described manner initiates the release of the local link for further use.

The calling party on receiving the dial tone from the distant P. A. X board dials the further digits necessary to effect connection with the distant required party. In response to each digit relay 2A, Fig. 9, at contacts 2A2 repeats the received impulses out over the tie line, relay 2C operating during each impulse train to provide at contacts 2C2 an impedance-free impulse repeating loop. Each time relay 2C operates it brings up a relief relay 2CA which functions at contacts 2CA1 to ensure that at the end of each impulse train, when relays 2C and 2CA release in turn, the holding loop to the distant local link A relay is increased in two stages from a zero impedance at the sending end to the full impedance of relay I.

When the connection is set up, ringing or busy tone is returned over the tie line to the calling party and release of the connection is subsequently under control of this party.

In the event of start signals being originated simultaneously from a tie line link in the "under 50" group and a newly-calling subscriber in the same group, in which instance relays LOC and SA, Fig. 3, will both be operated in series with the relay ST in the allotting equipment UAE, it will be seen from Fig. 5 that the originating call will get preference and that the tie line link will have to wait the short time necessary for the other call to be handled by allotting equipment UAE, after which this equipment will again function to start up the line finder in the tie line link.

If, in the above instance, the newly-calling subscriber is in the "over 50" group, both allotting equipments UAE and OAE will be started up simultaneously. The LOC relay marking will again get preference over the SA relay marking, so that in case equipment OAE switches through to a local link, the "over 50" finder switch therein will be started up to find the newly-calling subscriber, after which equipment UAE can come into operation to control the finding of the "under 50" finder switch in the tie line link. In case the equipment UAE first switches to a local link, then as a result of the operation of relay VR an "under 50" finder in this link will be set in operation to find a non-existent calling subscriber. Relay VR in operating will also bring in relay LOR, Fig. 5, and this relay will open the circuits of the series connected relays SA, Fig. 3, and ST in equipment UAE. In addition relay LOC will be released but relay ST in equipment OAE will remain held via the battery marking extended over wiper and bank AS1, common lead 16 and the newly-calling "over 50" subscriber's line circuit. Relay ST in equipment UAE in releasing will release relays SS, LK and VR in turn, whereupon the local link taken into use is released and the allotting switch AS associated with equipment UAE is stepped on to the next position. Relay VR in releasing restores relay LOR, whereupon relay ST in equipment UAE will re-operate in series with relay SA which also re-operates, while relays ST in equipment OAE and LOC will also re-operate. Both allotting equipments will now proceed to search for a free local link, and in the great majority of cases the "over 50" allotting equipment OAE will reach a free local link first and will start up a finder switch in this link to find the newly-calling party, after which the tie line call can be attended to. In the event of the equipment UAE again switching first the cycle of operations will be repeated until such time as equipment OAE can be the first to switch.

The above operations, which represent extraordinary switching conditions, will in fact only take a small interval of time so that the calling parties concerned will not be greatly aware of the extra time involved before a dial tone is returned either from a local link in the case of a newly calling party or from the distant P. A. X in the case of a distant tie line calling party. Similar remarks will apply under other simultaneous calling conditions between differing services.

Considering now the setting up of conference calls, reference should be had to the circuit of Fig. 11. Each subscriber requiring this feature will have a conference equipment such as CE associated with his line and connected therewith over the left-hand set of negative and positive conductors, the right-hand set of conductors connecting with the corresponding set of conductors of the line circuit. A relay such as 3CF in each equipment serves to provide an individual battery feed to each conference subscriber for conversation under conference conditions, and gives access via capacitors such as 3QA and 3QB to a pair of common interconnection leads across which are bridged the rectifiers 3MRA and 3MRB for the purpose of reducing the intensity of the acoutic shocks which occur when a conference subscriber switches into the common pair of leads. Relay 3CC which is connected to the SWG lead is common to eight conference equipments, a contact such as 3CC1 of this relay appearing in the circuit of each equipment as shown. Where more than eight subscribers require the conference facility, additional relays similar to 3CC will be provided.

Conference subscribers requiring to effect a conference call will dial the conference code number into the local links at the appointed time. A local link such as that of Figs. 6–8 on connecting with a conference code number switches in its H relay to the idle marking battery via resistance 3YC, Fig. 11, connected to the P contact of the conference code number in the connector switch multiple FSM and earth via relay ST in the allotting equipment concerned is then extended forward over the M lead through the local link into the conference equipment and then out over lead 24 to bring up the conference start relay SB, Fig. 3. The negative and positive contacts of the code number will be left unwired so that ringing out from the local link will extend into an open circuit. In response to the operation of a relay ST, the allotting switch searches for position 22 on its banks via which common access can be had to all the conference equipments such as CE, and when it reaches this position relay LK, Fig. 5, receives an earth supply in usual manner to enable it to switch in over the LINKS lead to the idle marking battery via resistance 3YB, Fig. 11. Relay VR then operates, and in usual manner brings up relay LOR, while relay FT is connected up to the FDR lead and switches to resistor 3YA, Fig. 11, whereupon earth is extended in the usual manner over the SWG lead to bring up relay 3CC. Relay 3CC in operating connects the earthed winding of the relay such as 3CF in each of the associated conference equipments through to the M lead in the line circuits concerned, whereupon the relay associated with the line circuit with which the local link concerned is connected will operate over the following circuit: earth, right-hand winding of relay 3CF, Fig. 11, contacts 3CF2 and 3CC1, M lead of local link finder bank and wiper UF4, Fig. 6, contacts CO6 and K3, CR4 and H7, Fig. 7, and connector switch M wiper and bank, Fig. 8, M lead, Fig. 11, lead 24, bank and wiper AS7, Fig. 5, contacts VR7 and resistor AYC to battery. Relay 3CF in operating, at contacts 3CF1 and 3CF2 extends the subscriber's line through to the common conference leads via capacitors 3QB and 3QA and at contacts 3CF3 applies earth to the P lead extending to the line circuit to force down relay K, Fig. 6, and so bring about release of the local link.

In case two subscribers in "under 50" and "over 50" groups simultaneously dial the conference number on to local links, the H relays of both these links will be able to switch in to resistor 3YC, Fig. 11, since this is only 166 ohms as against the usual value of 1300 ohms. Relay SB will then be operated in series with the parallel-connected ST relays in both the allotting equipments UAE and OAE and two allotting switches will therefore set out to find the conference link position. In the event of simultaneous testing, the LK relays in the two allotting equipments will both be able to switch in over the LINKS lead to resistor 3YB, Fig. 11, since this is only 75 ohms as against the usual value of 150 ohms. Relay 3CC will be operated as before, whereupon the relay 3CF in both conference equipments will operate over the respective line circuit M leads so as to connect up the line circuits concerned to the conference commons.

It may be that more than two subscribers, through delay in dialling, will set their local link connector switches on to the conference code number simultaneously. Under this condition all the H relays will be able to switch in to resistor 3YC, Fig. 11, this resistor being of such vaue that up to eight H relays can safely switch in. When relay 3CC is subsequently operated, all the relays 3CF of the line circuits concerned will switch in in parallel to the 200-ohm AYC battery supplied via lead 24 to the multiplied M contact of the conference code number in the connector switch multiple FSM.

Under conference conditions any subscriber can drop out at will by simply hanging up and can subsequently re-enter into conference by redialling the conference number.

It will be appreciated that where more than one conference group is provided on the P. A. X board, and some subscribers may be involved in two or more groups, an additional CF relay per line will be required for each new group and an additional CC relay per eight line group will also be required. The CC relays will serve to discriminate as to the particular conference code number dialled.

Consideration will now be given to the setting up of a fire alarm call for which reference should be had to the circuit of the fire alarm link FAL shown in Figs. 12 and 13.

Upon an outbreak of fire a warning can be given by dialling a predetermined code on any telephone. On receipt of a second dial tone a further digit such as 0 is dialled and the warning is given. The warning comprises a visual indication of the location of the calling telephone and also an audible alarm both of which are given at some selected central station and are maintained until released at that station. The caller can communicate with the person in attendance at the central station.

When the fire alarm code number is dialled on to a local link such as LL1 (Figs. 6, 7 and 8) the switching relay H operates over the incoming P lead, Fig. 13, to an idle marking resistance battery via resistors 4YF and 4YB. As in the case of the conference equipment, the ringing current now extends into an open circuit, since the negative and positive contacts of the fire alarm code number are left disconnected. On the operation of relay H, earth is extended via the start relay ST in the appropriate allotting equipment through the M lead of the local link into Fig. 13 and then out via lead 21 to bring up relay FA, Fig. 3. Contacts FA1, Fig. 5, mark position 1 of the allotting switch bank AS8 and relay ST functions in the usual manner to initiate the stepping of the switch. When the switch reaches position 1 over which access is had to the fire alarm link, an earth is connected up to relay LK via bank and wiper AS8 and this relay thereupon switches in over the LINKS lead to the battery connected resistor 4YA, Fig. 12. Relays VR and LOR then operate in turn, relay VR at contacts VR7 applying a 200-ohm battery via resistor AYC to lead 21 and relay LOR at contacts LOR2 disconnecting relay FA. Earth is also connected to the DM lead to drive the "under 50" or "over 50" finder switch 4UF or 4OF in link FAL according to the group in which the calling party is located.

When the calling line is found, relay FT operates to disconnect the finder switch driving magnet and at the same time applies earth to the SWG lead to bring up relay 4K, Fig. 12. The allotting equipment UAE proceeds to release in normal manner owing to the short-circuiting of relay ST by the low resistance earth through relay FT, while relay 4K locks via its contacts 4K1, at contacts 4K2 and 4K3 completes an operating circuit for relay 4A via the calling party's loop, and at contacts 4K4 applies earth to the P wiper 4UF3 or 4OF3 to hold the calling party's cut-off relay and at the same time to force down the series holding K relay in the local link and so to bring about forced release of this link in the manner already described. Contacts 4K5 return second dial tone to the calling party from the earthed dial tone source connected up to lead DTE. Relay 4A in operating brings up relay 4B which completes a locking circuit for relay 4K before the earth is removed from lead SWG on release of the allotting equipment and also prepares a charging circuit for capacitor 4QA. The second dial tone indicates to the calling party that the fire alarm link was not in use and that he has obtained connection to it.

If the calling party now dials a further digit such as 0, relay A will respond and bring up relay C throughout the train, during which time capacitor 4QA, Fig. 13, will be charged up via resistor 4YG. At the end of the train, relays A and B remain held and relay 4C releases slowly, and when it does so it connects up the charged capacitor 4QA to relay 4CR. If a suitable charge has been acquired by this capacitor, relay 4CR will operate to its make first contacts 4CR1 over which it operates fully and locks, at contacts 4CR2 it extends ringing tone to the calling party via RTE, at contacts 4CR4—4CR7 it connects up to the battery feeding retard 4D to the outgoing speaking conductors, and at contacts 4CR8 it applies resistance battery to lead 72 to initiate an alarm at the central station.

When the attendant operates the speaking key 4KS, contacts 4KS3 complete an energising circuit for relay 4AL and at the same time light the supervisory lamp 4LP while contacts 4KS1 and 4KS2 extend the speaking conductors, including retard D, to conductors 70 and 71 extending to the central station telephone. Relay 4AL in operating, at contacts 4AL1 completes a locking circuit for itself and disconnects the alarm circuit, at contacts 4AL2 applies resistance battery to wiper 4UF5 or 4OF5 so as to bring about an indication on a suitable indicator of the particular calling line as determined by the position of the one of the two finder switches 4UF or 4OF in question, and at contacts 4AL3 disconnects the ringing tone circuit.

When the calling party hangs up, relays 4A, 4B and 4K release in turn, and also relay 4CO if this has been operated, but relays 4CR and 4AL and also relay 4COR, if this has been operated, remain held to the central station equipment so that the indication as to the particular line calling remains displayed. Release of relays 4CR and 4AL and the extinguishing of the display is effected by operation of the release key 4KR which at contacts 4K1 opens the circuit of relay 4CR and at the same time imposes a short-circuiting earth upon the upper winding of relay 4AL to prevent this relay holding in series with the guard lamp 4LP.

In case a subscriber initiates a fire alarm call including the dialling of the extra digit and then hangs up before the central station replies, the alarm conditions are maintained and the indication at the central station as to the identity of the calling party is given as soon as the central station answers. If this station answers by throwing the speaking key 4KS, the alarm is cut off but the display remains until such time as the central station operates the release key on finding that there is no reply in response to the calling lamp.

Key 4KCO merely serves to cut off the alarm bell if the fire alarm telephone is already engaged on an outgoing conversation over the right-hand set of negative and positive conductors, Fig. 13, which extend to a normal line circuit. In this event the calling subscriber will generally hold on until the central station telephone becomes free when connection with him is effected in usual manner by the throwing of the speaking key 4KS, but as pointed out above, the alarm will still be given even if the calling party hangs up.

Considering now the setting up of watchman's service calls, certain subscribers' telephone instruments up to a maximum of say twenty-five on the watchman's route are selected for this service. On reaching each of these telephones during his round, he will dial the code number for the service, and wait for tone to be returned, after which he can clear down the connection. When the code has been dialled, a record of the call is made by a printing machine giving the identification of the calling telephone, time and date. Conversation with a central office can be obtained by dialling an additional digit such as 0 instead of clearing when the tone is received.

Referring now to Figs. 14 and 15 which show the circuit of a watchman's service link WL, when the appropriate code number is dialled by a watchman from a selected telephone on to a local link, the H relay in this link switches through over the P lead, Fig. 15, to the battery via resistor 5YD. In similar manner to that described in connection with the fire alarm link of Figs. 12 and 13, the WL link finder switch 5F is caused to search for the calling line and when it finds it, relay 5K, Fig. 14, is operated over the SWG lead and connects relay 5A through to the calling loop and extends an earth over the P wiper 5F3 to initiate forcible release of the local link. Relay 5K in operating also at contacts 5K6 returns dial tone to the calling watchman, whereupon he may either hang up or proceed to dial a further digit such as 0 to effect telephone communication with the central station. Relay 5K also at contacts 5K5 extends earth over wiper and bank 5F5 to initiate the operation of a printing machine which will stamp the identification of the calling line in accordance with the position of the switch 5F while it also stamps the time and date. Relay 5A in operating brings up relay 5B which locks relay 5K.

If the watchman hangs up on receiving the dial tone the link WL is released, but if he dials another digit such as 0 relay 5CR is brought up at the end of this digit by the charging of capacitor 5QA and at contacts 5CR2 it extends ringing tone to the calling party, while at contacts 5CR7 it completes an audible alarm circuit over lead 82. The central station replies by throwing the speaking key 5KS, whereupon the central station telephone is connected up with the calling line over leads 80 and 81 and key contacts 5KS1 and 5KS2, while at the same time relay 5KO is operated in series with the guard lamp 5LP which lights. Relay 5KO at contacts 5KO1 disconnects the alarm and locks up dependent on relay 5KR and at contacts 5KO2 disconnects ringing tone. At the end of conversation the calling watchman on hanging up releases relays 5A, 5B, 5CR and 5K but relay 5KO is also dependent on the central station and remains operated until the speaking key 5KS is restored to normal.

With the key 5KS in normal position the central station telephone connects up over the right-hand set of negative and positive conductors with a normal line circuit, whereby an outgoing call can be completed from this station.

Consideration will now be given to the setting up of a code call connection to a wanted subscriber who is absent from his telephone location.

For this purpose the line of a wanted party is connected with in normal manner via a local link and if there is no reply, or if the reply is made by a third party who is then requested to hang up, the caller will dial a further digit such as 0 as a result of which a start signal is extended to a code call link and the wanted line concerned is marked in the banks of a finder switch in this link. This finder switch then searches for and switches to the marking, the position of the finder switch being thus characteristic of the wanted line concerned and so determining the appropriate code which is then sent out in visual and/or audible form to suitable locations about the premises. On the positioning of the code finder switch on to the wanted line, a second finder switch in the code call link is caused to find the calling line in question, whereupon the local link is forcibly released for further common use. The wanted subscriber answers the code calling signal by dialling a common answering code number from any telephone, whereupon connection between the two parties is completed by way of the code call link, and the code calling signal is disconnected. At the end of conversation the code call link is only released when both parties hang up. Should a caller attempt to originate a code call to a subscriber not having this facility, or if the code call link is engaged when a code call is originated, busy tone is returned to the caller. It is not essential that the code call link on being started up should associate itself with both the called and calling lines, since on large P. A. X boards where many local links are available for use the code call link could simply connect up with a local link, both the local and code call links being utilised in series during the transmission of the code calling signal and the subsequent conversation.

Figure 16:
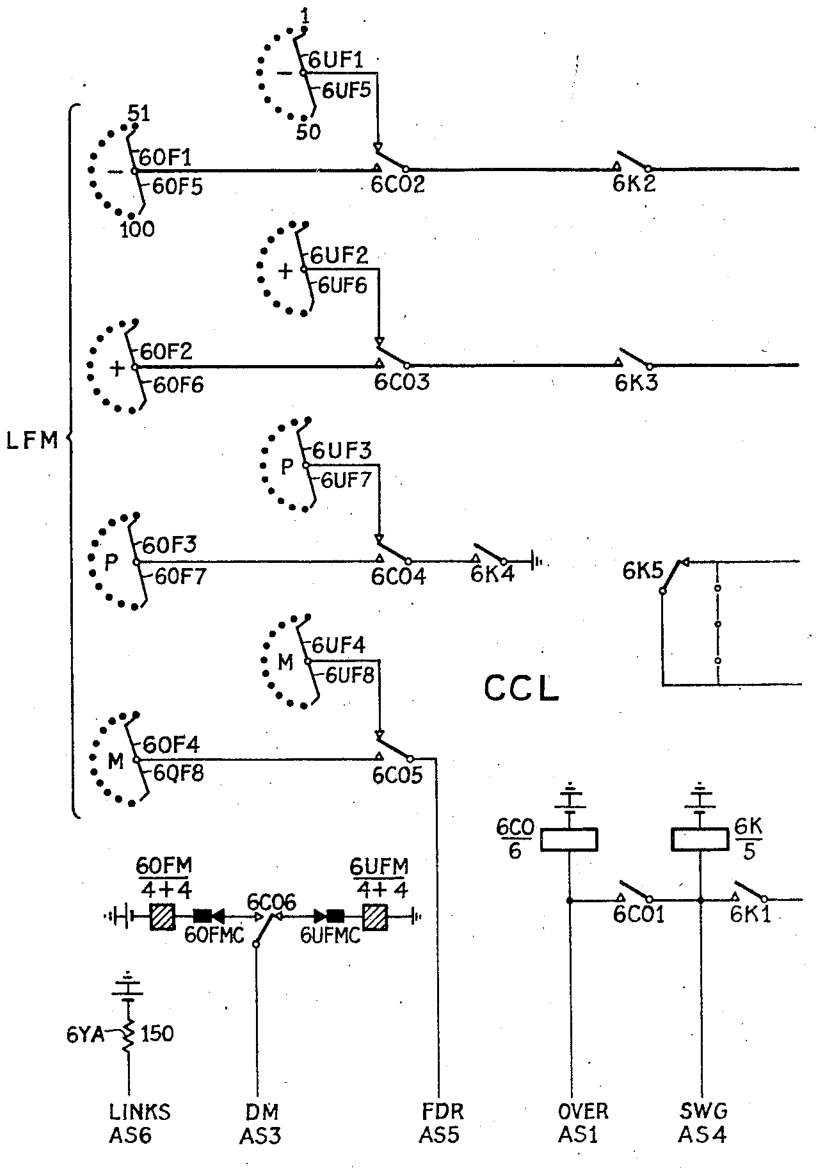
Figure 17:
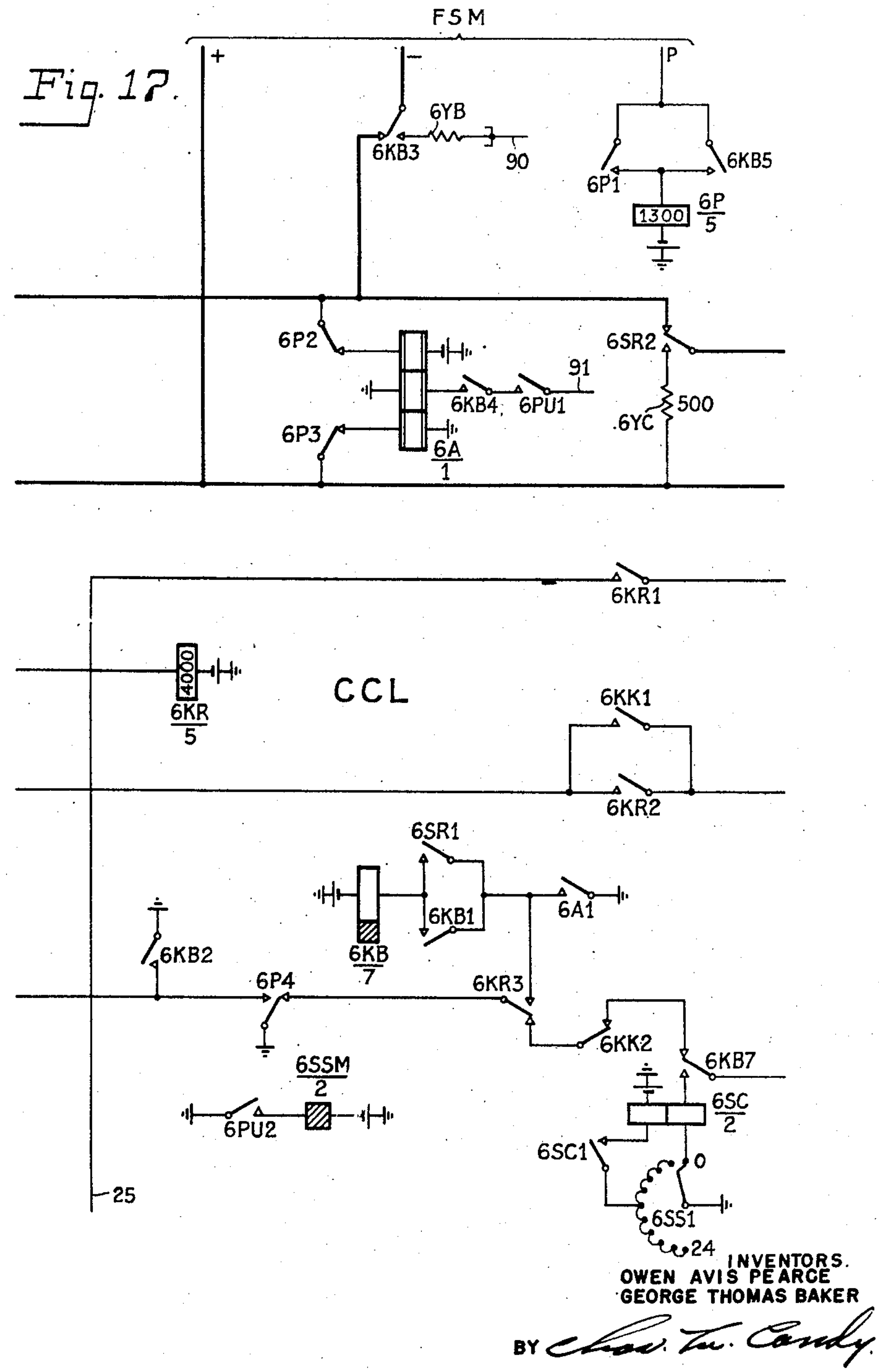
Figure 18:
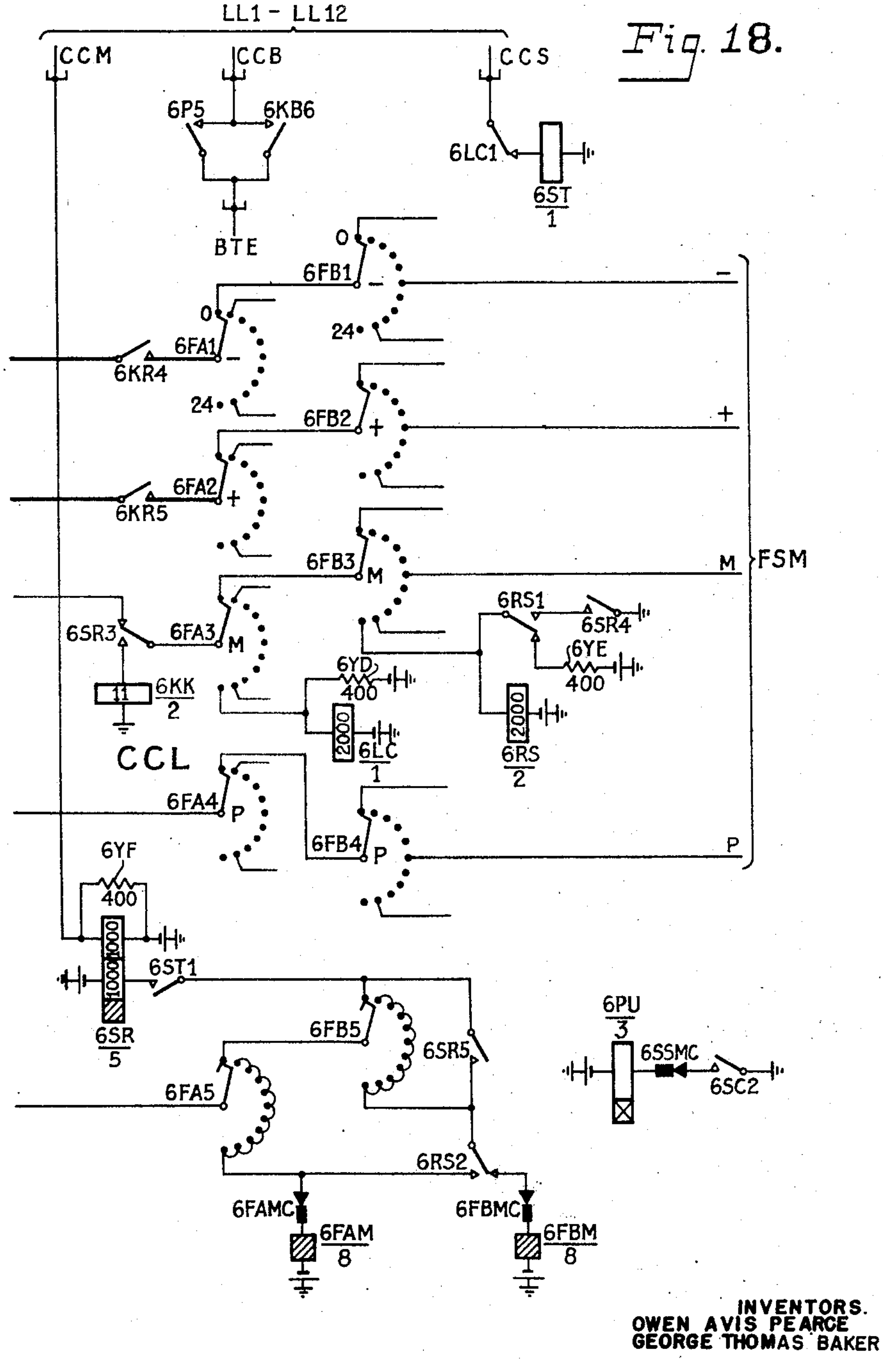

Referring now to the details of the circuit of the code call link CCL shown in Figs. 16–19, when a calling party, after having dialed the line of a party having code call facilities on to a local link such as that shown in Figs. 6–8, finds there is no reply or if the reply is made by a third party who is then requested to hang up, the caller will dial an extra digit such as 0 which is effective as previously described to bring up relay CR, Fig. 8, in the local link in addition to relays A, B, K and H which are operated if there has been no reply or relays A, B, K, F and H which are operated if the party replying has again hung up. Relay CR in operating, at contacts CR1 connects itself on to common lead CCS extending to the code call link, whereupon relay CST, Fig. 18, is operated in series with relay CR which holds. Relay CR also at contacts CR4 marks the wanted line concerned on the banks of the so-called code finder switch 6FA or 6FB, Fig. 18, the two switches together giving access to a maximum of 47 lines with code call facilities as will be seen later. The line marking is effected by means of battery potential via the upper winding of relay 6SR, Fig. 18, in parallel with resistor 6YF which extends over common lead CCM to Fig. 8 and then via contacts CR4 and H7 in the local link and connector switch M wiper which is positioned on the called line M lead, which lead, since it is associated with a line having code call facilities, will connect up with a position in the M bank 6FA3 or 6FB3 of the code finder switch 6FA or 6FB.

Relay 6ST in operating at contacts 6ST1 brings up relay 6SR over its lower winding from an earth via banks and wipers 6FB5 and 6FA5 and contacts 6KB7, 6KK2, 6KR3 and 6P4. Relay 6SR in operating, at contacts 6SR2, Fig. 17, prepares for tripping ringing from the local link via resistor 6YC in case the call to the wanted line had not been answered, at contacts 6SR3, Fig. 18, connects up relay 6KK to the series-connected wipers 6FA3 and 6FB3, and at contacts 6SR5 completes a driving circuit for the 6FB switch magnet 6FBM via magnet interrupter contacts 6FBMC, whereupon switch 6FB commences to rotate its wipers from the home position 0 in search of the particular wanted line concerned, which as previously described is marked by battery potential via the winding of relay 6SR in parallel with resistor 6YF.

Assuming now that the marking does not appear in the 6FB switch banks but instead in the 6FA switch banks, switch 6FB will rotate through to position 24 which is unwired except for the M bank so that relay 6KK will then rapidly operate from a local marking battery comprising the winding of relay 6RS and resistor 6YE in parallel. Under this condition relay 6KK in operating simply opens the magnet driving circuit at contacts 6KK2, Fig. 17, while relay 6RS at contacts 6RS1 completes a locking circuit for itself via contacts 6SR4, relay 6SR after having been held during the hunting operation over its lower winding now remaining held for a further short interval due to its slug. Contacts 6RS1 also short-circuit relay 6KK while contacts 6RS2 prepare a self-driving circuit for magnet 6FAM of switch 6FA so that when relay 6KK releases, contacts 6KK2 will complete the driving circuit for magnet 6FAM. When switch 6FA steps to the first effective position 1, the driving circuit is maintained independently of wiper and bank 6FB5 and the wipers continue to rotate until the marked wanted line is encountered. When this occurs, relay 6KK now operates rapidly from the marking battery on the M lead in the connector switch multiple FSM and opens the magnet driving circuit at contacts 6KK2 while at contacts 6KK1 battery via the high resistance relay 6KR is connected over the P wiper and bank 6FA4 to the P lead of the marked wanted line on which lead the called subscriber's cutoff relay is holding operated in series with the low resistance guarding winding of the H relay in the local link. Relay KR operates under this condition without disturbing the relations between relay K and the called subscriber's cut-off relay and thereupon at contacts 6KR1, Fig. 17, prepares for the starting up of the calling line finder 6UF or 6OF in the code call link, at contacts 6KR2 completes a holding circuit for itself, at contacts 6KR3 completes an operating circuit for relay 6KB and at contacts 6KR4 and 6KR5, Fig. 18, connects resistor 6YC across the negative and positive conductors, so that if ringing current is being sent out from the local link, the F relay therein is tripped and on operation of this relay the called subscriber's battery feeding relay D, Fig. 7, is energised. If the ringing has already been tripped in the local link, due to the call having been answered, relay D is operated immediately relay 6KR operates. Relay 6KB at contacts 6KB1 completes a locking circuit for itself independently of relay 6SR, at contacts 6KB3 connects up ringing return battery via common lead 90 and resistor 6YB to the negative contact of the answering code number in the connector switch multiple FSM, at contacts 6KB5 connects relay 6P to the appropriate P contact, at contacts 6KB6, Fig. 18, connects busy tone from common lead BTE on to common lead CCB so that busy tone would be returned to the calling subscriber via the windings of relay A, Fig. 6, but for the fact that relay CR, Fig. 8, is released on the operation of relay D, Fig. 7, and at contacts 6KB7 completes an operating circuit for relay 6SC via the particular code finder switch magnet concerned (nonoperative in this condition). Relay 6SC in operating at contacts 6SC1 prepares a locking circuit for itself and at contacts 6SC2, Fig. 18, brings up the pulsing relay 6PU.

Returning to the release of relay CR in the local link on the operation of relay D, it will be remembered that this relay was held operated in series with relay 6ST and this latter relay will therefore also have released provided no other code calling is in prospect. If a second local link requires the code call link at this time, relay 6ST will remain operated and the CR relay in the second local link in operating in series with the relay 6ST will complete a circuit to return busy tone to the second calling party via common lead CCB and contacts CR2, NR1 and E1, and the windings of relay A such as in Fig. 6. Relay CR in releasing in the local link concerned in the present description, at contacts CR2 prevents busy tone on lead CCB from being returned to the calling party and at contacts CR4 disconnects the M lead circuit over which relays 6KK and 6SR are being held in series. Relays 6KK and 6SR now release, whereupon at contacts 6SR2 the resistance termination of the negative and positive lines via resistor 6YC is replaced by relay 6A, whereupon relay D, Fig. 7, releases, while at contacts 6SR4, Fig. 18, the circuit of relay 6RS is opened. The release of relay 6RS is without effect at this time.

On the release of relay 6SR a circuit is also completed to start up a calling line finder switch in the code call link in the following manner. From reference to Fig. 3 it will be seen that battery via the code call link service discriminating relay SC normally extends over contacts LOR6 and lead 25 into Fig. 16 whence it extends through to contacts 6KR1. When relay 6SR releases this battery will be extended over contacts 6SR3 and then via wiper and bank 6FA3 or wipers and banks 6FA3 and 6FB3 as the case may be, to the M lead extending back to the calling local link and thence over the connector switch M bank and wiper, and contacts H7, CR4, KR3 and CO6 to the local link finder switch wiper and bank UF4 (assuming the calling party to be in the "under 50" group) which connects over the finder switch multiple LF with the M lead of the calling line circuit, Fig. 2, where a circuit will be found via resistor LYB and common lead 12 to earth via relay ST, Fig. 4, in the allotting equipment UAE. Both relays SC and ST operate this circuit, relay SC at its contacts SC1, Fig. 5, determining the finding priority of the call in question and relay ST functioning in usual manner to initiate the stepping of the allotting switch AS. When this switch reaches position 23 extending to the code call link CCL, an earth is connected up to relay LK, Fig. 5, via bank and wiper ASS and this relay thereupon switches in over the LINKS lead to the idle marking battery of the code call link via resistance 6YA, Fig. 16. Relay VR then operates and in usual manner brings up relay LOR, Fig. 4, while relay FT is connected up to the FDR lead. At the same time earth is extended over the DM lead to cause the "under 50" line finder switch 6UF in link CCL to search for the calling line.

When the calling line is found, relay FT operates over the FDR lead and wiper and bank 6UF4 and the circuit previously traced except that the battery connection to lead 25 by way of relay SC is now replaced by battery via resistor AYC, contacts VR7 and wiper AS7 in 23rd position. Relay FT in operating disconnects the finder switch 6UF driving circuit over the DM lead at contacts FT1, Fig. 4, and at the same time extends earth via its left-hand winding and the SWG lead to bring up relay 6K, Fig. 16. The allotting equipment proceeds to release in usual manner and relay 6K in operating locks over contacts 6K1, at contacts 6K2 and 6K3 extends the calling loop through to relay 6A which operates, at contacts 6K4 applies earth to the P wiper 6UF3 to force down the series holding K relay in the local link and hold the calling party's cut-off relay, and at contacts 6K5 opens the circuit of relay 6KR in the absence of the alternative dotted connection the purpose of which will be described later. Relay 6KR thereupon releases and at contacts 6KR1 opens the circuit of start lead 25 and at contacts 6KR3 renders the continued holding of relay 6KB dependent on relay 6A. In the local link relay K in releasing, at contacts K1 and K2 opens the circuit of relay A which thereupon releases and in the previously described manner initiates the release of the local link for further use.

Returning now to the operation of relay 6KB which occurred when the code finder found the wanted line, it will be remembered that this relay brought up relay 6SC which at its contacts 6SC2 brought up relay 6PU, Fig. 18. Relay 6PU in operating at contacts 6PU2 completes an energising circuit for the switch magnet 6SSM, Fig. 18, whereupon the magnet interrupter contacts 6SSMC disconnect the circuit of relay 6PU. Magnet 6SSM and relay 6PU interact to cause the switch 6SS to advance step-by-step over its banks, whereupon in dependence on the positions of the wipers of code finder switch 6FA or 6FB a suitable code will be sent out in visual and/or audible form to suitable locations about the premises. At the same time contacts 6PU1, Fig. 17, extend tone pulses from common lead 91 back to the calling party.

Figure 19:
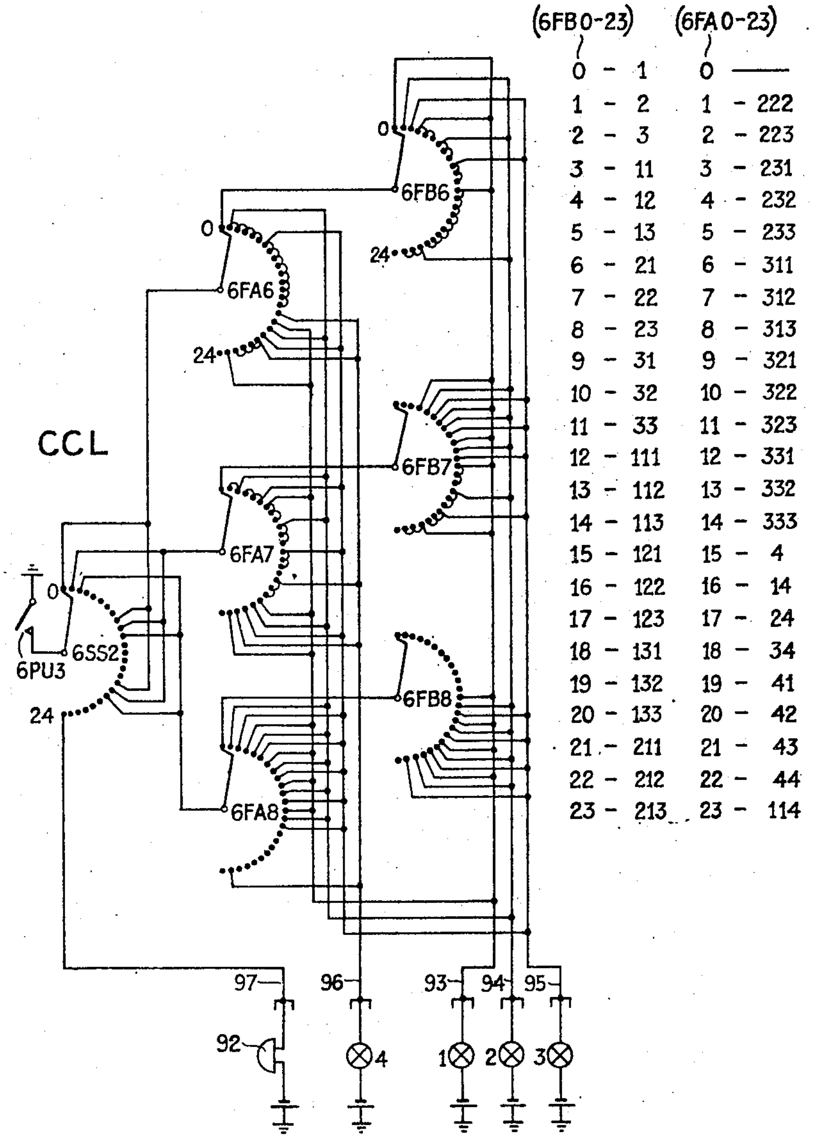

The sending out of the code calling signals may be done in any known manner, for instance by dot and dash audible codes or by spelling out the number on lamps. By way of example it is assumed as shown in Fig. 19 that the calling signals are set up on lamps for which purpose four lamps designated 1, 2, 3 and 4, and an alarm bell 92 which connect up with the code call link over leads 93—97 are provided at each suitable location about the premises. the lamps and bells either being directly operated as shown or indirectly operated in local circuits by means of directly operated responding relays. The function of the alarm bell is to give a warning just prior to the commencement of each lamp signalling cycle.

Referring now to Fig. 19 and assuming for example that the wanted line is marked on the home position 0 of the code finder switch 6FB in which instance relay 6KK will have operated with the wipers in the home position shown, during the interaction of relay 6PU and the switch magnet 6SSM, wiper 6SS2 in rotating over the bank arc will cause lamp No. 1 to flash once during each of three spaced signalling periods. If switch 6FB is positioned on position 1, lamp No. 2 will flash once during each of these periods. If switch 6FB occupies position 3 lamp No. 1 will be flashed twice in succession during each of these periods, while if switch 6FB occupies position 4 lamps Nos. 1 and 2 will be flashed in succession during each of these periods. If the switch 6FB is in position 12, lamp No. 1 will be flashed three times in succession during each of the periods, and so on, the table shown in Fig. 19 indicating the lamps which are flashed during each of the three spaced signalling periods for each of the possible operative positions 0–23 and 1–23 of switches 6FB and 6FA respectively.

It will be seen that just prior to the commencement of each signalling cycle, i. e. when switch 6SS is occupying position 24, an audible alarm is given on the bells such as 92 over lead 97.

This code call signalling operation will be proceeding while the finder switch 6UF, Fig. 16, is finding the calling line and it continues until the wanted subscriber answers the signal by dialling a common answering code number from any convenient telephone.

When this is done, the H relay in the local link taken into use by this party switches in over the P contact of the answering code number in the connector switch bank FSM to relay 6P, Fig. 17, whereupon the battery via common lead 90 and resistor 6YB applied to the incoming negative lead at this point trips the ringing from the local link and so brings up the F relay therein, which relay connects relay D to the incoming negative and positive conductors. Relay 6P in operating, at contacts 6P1 locks independently of relay 6KB, at contacts 6P2 and 6P3 disconnects relay 6A from across the negative and positive lines extending to the original calling party, at contacts 6P4 maintains a holding circuit for relay 6K independently of contacts 6KB2, and at contacts 6P5, Fig. 18, maintains the busy tone circuit to lead CCB independently of contacts 6KB6. On the release of relay 6A relay 6KB releases, whereupon at contacts 6KB3 the negative and positive leads incoming via the multiple FSM from the wanted subscriber are connected through to the original calling subscriber. At contacts 6KB7 the operating circuit for relay 6SC is opened so that when switch 6SS next reaches the home position relay 6SC will fail to hold and in releasing will prevent a further code signalling cycle from recommencing.

The two parties now converse via the code call link and the local link taken into use by the wanted party, the original calling party now acting as the called party and being supplied by battery feeding current via relay D in the local link.

During conversation one or more other local links can switch in via their CR relays to the code call link relay 6ST but so long as relay 6P remains operated no further driving circuits can be completed for the code finder switches. The calling subscribers concerned will receive busy tone via lead CCB and their respective local links, and they will hold on until the code call link becomes available.

At the end of the conversation, when the parties hang up the local link taken into use is released in usual manner and relay 6P is also released. Relay 6P in releasing brings down relay 6K and disconnects the CCB lead busy tone circuit. At the same time it completes homing circuits for the code finder switches and when these switches reach home a circuit is completed to re-operate relay 6SR, whereupon the code finder switches will search for and switch through to the first one of the wanted lines which is encountered, after which the operations follow in the manner already described. Any other waiting local links will again receive busy tone until such time as they can be dealt with in turn.

As mentioned previously, it is not essential for the code call link to associate itself by finding with the calling party and then to release the original local link, since this link could be retained in the connection between the calling party and the code call link. In this instance the calling line finder equipment of Fig. 16 would not be required and relay 6KR, Fig. 17, would be permanently connected to parallel connected contacts 6KK1 and 6KR2 by the connection shown in Fig. 16 comprising lines intercepted by circles. In this event when the wanted party dialled the common answering code number, the subsequent conversation would be effected via the link taken into use by the calling wanted party, the switches 6FA and 6FB of the code call link and the original local link taken into use by the original calling party.

In case a code call link on being started up is unable to find the wanted line, the code finder switch FA will rotate through to position 24 where relay 6KK will operate in series with relay 6LC to stop the finding operation. Relay 6LC at contacts 6LC1 disconnects the series holding circuit between relay 6ST and relay CR in the calling local link. Relay 6KK in operating disconnects the finder switch magnet driving circuit but in this instance is unable to operate relay 6KR since no earth supply is available from the P lead in the connector switch multiple FSM so that the code call link finder is not set into operation. Relay CR in the local link in releasing opens the operating circuit for relay 6SR via the CCM lead, while relay 6ST in releasing opens the circuit of the other winding of this relay which thereupon releases and at contacts 6SR3 opens the circuit of relay 6KK. Relay 6KK in releasing completes a homing circuit for the one or both of the code finder switches which have been brought into operation. The code call link is thus freed for further use, while if the ringing has not been tripped in the local link the calling subscriber will continue to receive ringing tone and the called subscriber will continue to be rung.

The invention is not limited in scope to the special services described, as other special services such as revertive call service could be operated on the same finder principle involving release of the local link. On such calls the procedure would be that where one party of a party line wished to gain access to another party on the same line, the calling party would dial a special number which would give him access via a local link to a party line link. The party line link would then associate itself by finding with the calling party line, whereupon the local link would be released. The calling subscriber now dials the number of the wanted subscriber into the party line link and hangs up, the party line link may now, for example, send out ringing current in code form appropriate to the required subscriber back over the party line, the bells of all subscribers on this line being actuated. The wanted party on hearing his ringing code will remove his receiver and thus trip the ringing, whereupon the calling party will know that the required party has answered and will also remove his receiver so that intercommunication between the two parties can be effected, the battery feeding current being supplied from the party line link. It will be appreciated that relay SC and its associated lead 27 in Fig. 3 would serve for some other special service which would have the lowest priority.

As regards the allotting of local and special service link finder switches, the arrangements described have involved allotting equipments utilising uniselectors and relays, two allotting equipments being provided for the board regardless of its capacity, i. e. regardless of whether it comprises one, two or three 35-line units in the example described.

As an alternative, the allotting equipments might be of the all-relay type for instance as described in the application of John W. McClew et al., Serial No. 567,223, filed December 8, 1944, now Patent No. 2,424,281, granted July 22, 1947, in which instance the allotting equipments will be provided on a basis of one relay allotting equipment per unit. This permits each unit equipment to be identical and the cost of allotting equipment to be pro rata to the size of installation. Should the board consist of more than one unit, simultaneous calls can then be handled on the basis of one per unit. Special services in this instance will have their own relay allotting arrangements so that these can be operated simultaneously with, and independently of, the local calls, the possibility of cross-switching in such circumstances being avoided by using distinctive testing circuits, for instance, in the manner disclosed in the application of John W. McClew et al., Serial No. 567,224, filed December 8, 1944, now Patent No. 2,442,092, granted May 25, 1948.

The P. A. X board is not limited in scope to 100 lines capacity since by providing connecting switches of the 200-point type and by operating the link finder switches in two separate and distinct 100 line groups, a board of an ultimate capacity of 200 lines can be readily provided.

It should also be mentioned that some or all of the features of the invention may also find application to private automatic branch exchanges and to rural exchanges either of automatic or semi-automatic type.

We claim:

1. In a telephone system, subscribers' lines, a local link circuit comprising a finder switch and a connector switch, both switches having access to said lines, means responsive to the initiation of a call over one of said lines for causing said finder to find the calling line, means operated responsive to a first series of digits received over said calling line to effect operation of said connector switch, a battery feed relay for the called line in said connector switch energized at times responsive to operation of said first means, said connector switch operated to extend said call to a called line, means for at times making said called line busy, and means responsive to a further series of impulses over said calling line operative to effect connection of the calling line to said called busy line whenever said battery feed relay is in the energized condition.

2. In a telephone system, subscribers' lines, a local link circuit including a finder switch and a connector switch having access to said lines, an allotter operated responsive to the initiation of a call over one of said lines for causing said finder to find the calling line, a plurality of special service links, equipment individual to each special service, each link appropriate to a special service, a finder switch individual to each special service link, said connector switch operated responsive to a series of digits transmitted over said calling line to extend the call to the desired special service equipment, said allotter operative to control operation of one of the finder switches associated with the said called special service equipment to connect the special service link associated with the operated finder switch with the calling line whenever a call is extended to the desired special service equipment.

3. In a telephone system, a central office having an operator's position, subscribers' lines, a local link circuit comprising a finder switch and a connector switch, both switches having access to said lines, means responsive to initiation of a call over one of said lines for causing said finder to find the calling line, a fire alarm link circuit, said connector operated responsive to the receipt of impulses over said line representing a predetermined number to extend the calling line to said fire alarm link circuit, said fire alarm link circuit operated responsive to a further series of impulses over said line to send an alarm signal to said operator's position, means in one of said link circuits held operated to identify said calling line whenever the calling line connection is released, and means at said operator's position for effecting release of said latter means when identify of said line has been established.

4. In a telephone system, a central office having an operator's position, subscribers' lines, a local link circuit comprising a finder switch and a connector switch, means responsive to initiation of a call over said finder to find the calling line, a watchman's alarm service link circuit, said connector responsive to a receipt of impulses over said line representing a predetermined number to extend the calling line to said watchman's alarm link circuit, means in said watchman's alarm circuit operated when a call is extended thereto for recording the identity of said calling line with time and date of the call, and means in said watchman's alarm link circuit operated responsive to a further series of impulses of predetermined duration over said line to send an alarm signal to said operator's position.

5. In a telephone system, code call equipment, subscribers' lines, certain of said lines equipped with code call facilities, certain of said lines having priority connections, a local link circuit comprising a finder switch and a connector switch, both switches having access to said lines, means responsive to the initiation of a call over one of said lines having priority connections for causing said finder to find the calling line, means responsive to a series of impulses representing digits received over said calling line to cause said connector to tender the call to a called line having code call facilities, means for making said called line busy at times, means in said connector operated responsive to a second series of impulses received over said calling line to cause said connector to connect said calling line to said called line when busy and to connect said calling line to said code call equipment whenever said called party on said idle called line fails to answer, and means in said code call equipment operated responsive to an operation by the called party to release said local link for further use.

6. In a telephone system, subscribers' lines some of which are entitled to priority service, a local link circuit comprising a finder switch and a connector switch, both switches having access to said lines, an allotter responsive to the initiation of a call over one of said lines for causing said finder to find the calling line, a battery feed relay, a marginal relay in said allotter operated responsive to operation of said finder to operate said battery feed relay only if said calling line is entitled to priority service, said connector operated responsive to a first series of digits to extend a call to the called line, means for at times making said called line busy, and means in said connector operated responsive to a second series of impulses to connect said calling line to said busy called line whenever said battery feed relay is operated.

7. A system as claimed in claim 1 in which said last means comprises a condenser in said connector arranged to be charged for the receiving period of the second series of impulses, a relay operated responsive to a sufficient charge on said condenser on cessation of said incoming impulses, and contacts on said relay operated responsive to operation of same to connect the calling line to the busy called line.

8. In a telephone system, subscribers' lines, a plurality of local link circuits each comprising a finder switch and a connector switch, both switches of said link circuits having access to said lines, allotting equipment responsive to the initiation of a call over one of said lines for causing one of said finders to find the calling line, a plurality of separate link circuits including a finder switch appropriate to various special services, said connector switch of said operated link circuit operated responsive to a predetermined series of digits over said calling line to extend the call to the desired special service of said plurality, said allotter operated responsive to a call being extended to a special service to control operation of said finder switch associated with said special service link, and a relay chain in said allotter operative to determine the operating priority of the different types of said special services.

9. A telephone system as claimed in claim 2 in which said subscriber lines are divided into groups and said local link includes a pair of line finders, each of said finders being associated with a particular one of said groups, said allotter operated responsive to a call over one of said lines to effect operation of the proper line finder.

10. In a telephone system, groups of subscribers' lines, a local link circuit including a pair of finder switches and a connector having access to said lines, a pair of allotters each of which is associated with a particular group of lines, one of said pair of allotters operated responsive to the initiation of a call over one of said groups of lines for causing one of said finders to find the calling line, the other of said pair of allotters operated responsive to initiation of a call over another of said groups of lines for causing the other of said finders to find the other calling line, a plurality of special service links each having an associated finder and being appropriate to a special service, said connector operated responsive to a series of digits over said calling line to extend the call to the desired special service link, said one allotter operative to control operation of the finder switch associated with said special service equipment, said other allotter operated to cause said one finder to find said one calling line whenever said one allotter fails to function properly.

11. In a telephone system, subscriber's lines, a local link, allotting equipment operated on initiation of a call over one of said lines for causing the local link to find the calling line, a plurality of special service facilities, a plurality of links individual to one of said special services, means individual to the special service for determining if one of said special service links is idle, and effective, whenever one of said special service links is idle, to operate said allotting equipment to find an idle link of said special service, said idle link thereupon operated to find a calling line and effect release of said local link and said allotting equipment.

12. In a telephone system, subscriber's lines, automatic switches for completing calls between subscribers responsive to a normal dialling operation, a plurality of special services, means in said switches operated at times to extend a call over one of said lines to a particular special service in response to the dialling of a number assigned thereto which comprises a similar number of digits to the normal numbers for establishing intersubscriber calls, means in said particular service thereby operated to associate itself with the calling line, means in said service effective to operate responsive to receipt of a further digit of a predetermined value; said first means in said switches operated at other times to establish a normal intersubscriber call, another special service operated in the event the call is not established responsive to the dialling of an additional digit of a predetermined value, the additional digit effective to operate said one special service and said other special service being of the same predetermined value.

13. In a telephone system, subscribers' lines having call numbers individually assigned thereto, a local link circuit comprising a finder switch and a connector switch, both said switches having access to said lines, means responsive to the initiation of a call over one of said lines for causing said finder switch to find the calling line, a plurality of special link circuits each associated with a special alarm service and each special alarm service having a characteristic call number individually assigned thereto, means for operating said connector switch to extend a call to another local subscriber's line in case impulses corresponding to the call number assigned to said other local subscriber's line are received over said calling line, or for operating said connector switch to extend a call to one of said special link circuits in case impulses corresponding to the call number individually assigned to said one special alarm service and its associated special link circuit are received over said calling line, means responsive to the extension of said call to said one special link circuit for operating said one special link circuit to find the calling line, means in said one special link circuit responsive to said one special link circuit finding said calling line for transmitting a signal over said calling line, and means in said one special link circuit operable in reponse to a further series of impulses received from said calling line to effect operation of said one special alarm service facility.

14. In a telephone system, subscriber's lines, a local link circuit comprising a finder switch and a connector switch, both switches having access to said lines, means responsive to the initiation of a call over one of said lines for causing said finder to find the calling line, means operated responsive to a first series of digits received over said calling line to effect operation of said connector switch, a battery feed relay for the called line in said connector switch energized at times responsive to operation of said first means, said connector switch operated to extend said call to a called line, means for at times making said called line busy, means responsive to a further series of impulses over said calling line operative to effect connection of the calling line to said called busy line whenever said battery feed relay is in the energized condition, and means for automatically ringing the called line when said busy connections of the original busy call are severed.

15. In a telephone system, subscribers' lines some of which are entitled to priority service, a local link circuit comprising a finder switch and a connector switch, both switches having access to said lines, an allotter responsive to the initiation of a call over one of said lines for causing said finder to find the calling line, a battery feed relay, a marginal relay in said allotter operated responsive to operation of said finder to operate said battery feed relay only if said calling line is entitled to priority service, said connector operated responsive to a first series of digits to extend a call to the called line, means for at times making said called line busy, and relay-controlled capacitor discharge means in said connector operated responsive to a second series of impulses to connect said calling line to said busy called line whenever said battery feed relay is operated.

OWEN AVIS PEARCE.
GEORGE THOMAS BAKER.

REFERENCES CITED

The following references are of record in the file of this patent:

UNITED STATES PATENTS

| Number | Name | Date |
|---|---|---|
| Re. 17,006 | Nelson | June 19, 1928 |
| 1,763,161 | Koechling et al. | June 10, 1930 |
| 1,775,522 | Gould | Sept. 9, 1930 |
| 1,792,454 | Voss | Feb. 10, 1931 |
| 1,872,720 | Flenley | Aug. 23, 1932 |
| 1,944,570 | Olson | Jan. 23, 1934 |
| 2,187,903 | Herrick | Jan. 23, 1940 |
| 2,269,361 | Dewire | Jan. 6, 1942 |
| 2,324,341 | Waller | July 13, 1945 |